US011326570B1

(12) United States Patent
Fliearman et al.

(10) Patent No.: US 11,326,570 B1
(45) Date of Patent: May 10, 2022

(54) MULTI-MODE INTEGRATED STARTER-GENERATOR DEVICE WITH UNIDIRECTIONAL INPUT

(71) Applicant: Deere & Company, Moline, IL (US)

(72) Inventors: Steven R. Fliearman, Coffeyville, KS (US); Lisa R. Lloyd, Independence, KS (US); Jeffrey S. Turner, Coffeyville, KS (US); Douglas S. Base, Coffeyville, KS (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/080,562

(22) Filed: Oct. 26, 2020

(51) Int. Cl.
*F02N 11/04* (2006.01)
*F16H 3/66* (2006.01)
(Continued)

(52) U.S. Cl.
CPC .............. *F02N 11/04* (2013.01); *B60K 17/02* (2013.01); *B60K 17/06* (2013.01); *B60K 17/22* (2013.01); *F16H 3/66* (2013.01); *F16H 2200/0034* (2013.01); *F16H 2200/0039* (2013.01); *F16H 2200/2007* (2013.01);
(Continued)

(58) Field of Classification Search
CPC ...... F16H 2200/2007; F16H 2200/2033–2038; F16H 3/62; F16H 3/66; F16H 2003/442; B60K 17/02–06; F02N 11/04
See application file for complete search history.

(56) References Cited

U.S. PATENT DOCUMENTS 2,685,948 A   8/1954 Freeman et al.
3,062,073 A   11/1962 Brass
(Continued)

FOREIGN PATENT DOCUMENTS

DE   69218975 T2   6/1994
DE   10007959 A1   9/1998
(Continued)

OTHER PUBLICATIONS

German Search Report issued in German Application No. 102021113913.9 dated Sep. 30, 2021. (8 pages).
(Continued)

*Primary Examiner* — David R Morris
*Assistant Examiner* — Lillian T Nguyen
(74) *Attorney, Agent, or Firm* — Klintworth & Rozenblat IP LLP

(57) ABSTRACT

A combination starter-generator device includes a power transmission assembly with first and second planetary gear set stages. One or more of the planetary gear set stages includes an idler gear and a ring gear. A clutch arrangement is coupled to effect a delivery mode in which power flows in a first power flow direction and a generation mode in which power flows in a second power flow direction. In delivery mode, input power is received in the first rotational direction from the electric machine and output power is provided in the first rotational direction to the engine as the first power flow direction. In generation mode, one or more of the planetary gear set stages receives input power in the first
(Continued)

rotational direction and outputs power in the first rotational direction to the electric machine as the second power flow direction.

16 Claims, 13 Drawing Sheets

(51) Int. Cl.
    *B60K 17/06*         (2006.01)
    *B60K 17/22*         (2006.01)
    *B60K 17/02*         (2006.01)

(52) U.S. Cl.
    CPC ................ *F16H 2200/2033* (2013.01); *F16H 2200/2035* (2013.01); *F16H 2200/2038* (2013.01)

(56) References Cited

U.S. PATENT DOCUMENTS

| | | |
|---|---|---|
| 3,081,759 A | 3/1963 | Mauck et al. |
| 3,150,544 A | 9/1964 | Brass |
| 3,640,152 A | 2/1972 | Shirai et al. |
| 3,675,511 A | 7/1972 | Wakamatsu et al. |
| 3,942,024 A | 3/1976 | Ingham |
| 4,122,354 A | 10/1978 | Howland |
| 4,213,299 A | 7/1980 | Sharer |
| 4,473,752 A | 9/1984 | Cronin |
| 4,484,495 A | 11/1984 | Mason |
| 4,631,455 A | 12/1986 | Taishoff |
| 4,708,030 A | 11/1987 | Cordner |
| 4,750,384 A | 6/1988 | Belliveau |
| 4,862,009 A | 8/1989 | King |
| 4,926,713 A | 5/1990 | Madill |
| 5,033,994 A | 7/1991 | Wu |
| 5,177,968 A | 1/1993 | Fellows |
| 5,418,400 A | 5/1995 | Stockton |
| 5,558,173 A | 9/1996 | Sherman |
| 5,856,709 A | 1/1999 | Ibaraki et al. |
| 6,015,363 A | 1/2000 | Mathis |
| 6,371,877 B1 | 4/2002 | Schroeder et al. |
| 6,378,479 B1 | 4/2002 | Nishidate et al. |
| RE37,743 E | 6/2002 | Yang |
| 6,409,622 B1 | 6/2002 | Bolz et al. |
| 6,484,596 B2 | 11/2002 | Puchas |
| 6,527,658 B2 * | 3/2003 | Holmes ................ B60K 6/445 903/910 |
| 6,569,054 B2 | 5/2003 | Kato |
| 6,582,333 B2 | 6/2003 | Man |
| 6,661,109 B2 | 12/2003 | Fukasaku et al. |
| 6,746,354 B1 | 6/2004 | Ziemer |
| 6,770,005 B2 | 8/2004 | Aikawa et al. |
| 6,832,970 B2 | 12/2004 | Eibler |
| 6,852,063 B2 | 2/2005 | Takahashi et al. |
| 6,910,453 B2 | 6/2005 | Sugino et al. |
| 6,965,173 B2 | 11/2005 | Fukasaku et al. |
| 7,028,794 B2 | 4/2006 | Odahara et al. |
| 7,044,255 B2 | 5/2006 | Maeda et al. |
| 7,086,978 B2 | 8/2006 | Aikawa et al. |
| 7,117,965 B2 | 10/2006 | Yatabe et al. |
| 7,223,191 B2 | 5/2007 | Aikawa et al. |
| 7,374,031 B2 | 5/2008 | Skorucak |
| 7,387,043 B2 | 6/2008 | Sakamoto et al. |
| 7,503,871 B2 | 3/2009 | Kozarekar et al. |
| 7,582,033 B2 | 9/2009 | Kefti-Cherif et al. |
| 7,753,147 B2 | 7/2010 | Usoro |
| 7,780,562 B2 | 8/2010 | King et al. |
| 8,143,735 B2 | 3/2012 | Bauer |
| 8,226,517 B2 | 7/2012 | Tsai et al. |
| 8,235,859 B2 | 8/2012 | Yun |
| 8,480,529 B2 | 7/2013 | Pohl et al. |
| 8,500,601 B2 | 8/2013 | Arnold et al. |
| 8,584,359 B1 | 11/2013 | Bowman |
| 8,727,944 B2 | 5/2014 | Noboru et al. |
| 8,734,281 B2 | 5/2014 | Ai et al. |
| 8,996,227 B2 | 3/2015 | Sisk et al. |
| 9,017,207 B2 | 4/2015 | Pohl et al. |
| 9,074,656 B2 | 7/2015 | Benz et al. |
| 9,145,136 B2 | 9/2015 | Suntharalingam et al. |
| 9,184,646 B2 | 11/2015 | Fulton |
| 9,261,064 B2 | 2/2016 | Patel et al. |
| 9,371,810 B2 | 6/2016 | Creviston |
| 9,421,855 B2 | 8/2016 | Suntharalingam et al. |
| 9,541,172 B1 | 1/2017 | Wright |
| 9,555,795 B2 | 1/2017 | Nefcy et al. |
| 9,676,265 B2 | 6/2017 | Choi |
| 9,726,282 B2 | 8/2017 | Pohl et al. |
| 9,829,103 B2 | 11/2017 | Volpert |
| 10,183,569 B2 | 1/2019 | Toyota et al. |
| 10,422,389 B2 | 9/2019 | Ebihara |
| 10,479,187 B2 | 11/2019 | Lubben et al. |
| 10,487,918 B2 | 11/2019 | Turner et al. |
| 10,518,626 B2 | 12/2019 | Pettersson |
| 10,519,920 B2 | 12/2019 | Patil et al. |
| 10,591,025 B2 | 3/2020 | Fliearman et al. |
| 10,619,711 B2 | 4/2020 | Fliearman et al. |
| 2001/0019210 A1 | 9/2001 | Fukasaku et al. |
| 2001/0025621 A1 | 10/2001 | Shiraishi et al. |
| 2001/0042649 A1 | 11/2001 | Maeda et al. |
| 2002/0019284 A1 | 2/2002 | Aikawa et al. |
| 2002/0033059 A1 | 3/2002 | Pels |
| 2002/0117860 A1 | 8/2002 | Man et al. |
| 2002/0139592 A1 | 10/2002 | Fukasaku et al. |
| 2002/0177504 A1 | 11/2002 | Pels |
| 2003/0001391 A1 | 1/2003 | Kuang et al. |
| 2003/0104900 A1 | 6/2003 | Takahashi |
| 2003/0224888 A1 | 12/2003 | Wilder et al. |
| 2004/0055800 A1 | 3/2004 | Katou et al. |
| 2004/0116226 A1 | 6/2004 | Baker et al. |
| 2006/0111211 A1 | 5/2006 | Kefti-Cherif et al. |
| 2006/0154771 A1 * | 7/2006 | Klemen ................ B60K 6/365 475/5 |
| 2006/0166777 A1 | 7/2006 | Aikawa et al. |
| 2007/0108006 A1 | 5/2007 | Schmid et al. |
| 2007/0157899 A1 | 7/2007 | Seufert et al. |
| 2007/0265126 A1 | 11/2007 | Janson et al. |
| 2008/0179119 A1 | 7/2008 | Grenn et al. |
| 2008/0314195 A1 | 12/2008 | Andoh et al. |
| 2009/0055061 A1 | 2/2009 | Zhu |
| 2009/0176611 A1 | 7/2009 | Avery |
| 2009/0264241 A1 | 10/2009 | Dittrich et al. |
| 2009/0312145 A1 | 12/2009 | Pohl et al. |
| 2010/0029428 A1 | 2/2010 | Abe et al. |
| 2010/0044183 A1 | 2/2010 | Guggolz et al. |
| 2010/0048338 A1 | 2/2010 | Si |
| 2010/0063704 A1 | 3/2010 | Okubo et al. |
| 2010/0076634 A1 | 3/2010 | Brigham |
| 2010/0190602 A1 | 7/2010 | Wittkopp et al. |
| 2010/0234166 A1 | 9/2010 | Samie et al. |
| 2011/0010031 A1 | 1/2011 | Syed et al. |
| 2011/0015020 A1 | 1/2011 | Grosser |
| 2011/0053729 A1 | 3/2011 | Parsons et al. |
| 2011/0070999 A1 | 3/2011 | Soliman et al. |
| 2011/0263379 A1 | 10/2011 | Liang et al. |
| 2012/0103293 A1 | 5/2012 | Robinette et al. |
| 2012/0165156 A1 | 6/2012 | Oguri |
| 2012/0235473 A1 | 9/2012 | Jiang et al. |
| 2012/0240723 A1 | 9/2012 | Glucker et al. |
| 2012/0316026 A1 | 12/2012 | Oguri et al. |
| 2013/0046427 A1 | 2/2013 | Hohenberg |
| 2013/0252773 A1 | 9/2013 | Suntharalingam et al. |
| 2013/0316873 A1 | 11/2013 | Jansen et al. |
| 2014/0011619 A1 | 1/2014 | Pohl et al. |
| 2014/0128205 A1 | 5/2014 | Phillips et al. |
| 2014/0137824 A1 | 5/2014 | Jacques et al. |
| 2014/0150604 A1 | 6/2014 | Kaltenbach |
| 2014/0256490 A1 | 9/2014 | Honda |
| 2015/0226323 A1 | 8/2015 | Pohl et al. |
| 2015/0239335 A1 | 8/2015 | Wachter et al. |
| 2016/0031438 A1 | 2/2016 | Matsui et al. |
| 2016/0031439 A1 | 2/2016 | Nefcy et al. |
| 2016/0052382 A1 | 2/2016 | Clark et al. |
| 2016/0076629 A1 | 3/2016 | Modrzejewski et al. |

(56) References Cited

U.S. PATENT DOCUMENTS

| | | |
|---|---|---|
| 2016/0082821 A1 | 3/2016 | Mueller et al. |
| 2016/0096522 A1 | 4/2016 | Ortmann et al. |
| 2016/0137045 A1 | 5/2016 | Zhu et al. |
| 2016/0200311 A1 | 7/2016 | Nefcy et al. |
| 2016/0207525 A1 | 7/2016 | Nefcy et al. |
| 2016/0258495 A1 | 9/2016 | Bird |
| 2016/0288780 A1 | 10/2016 | Shukla et al. |
| 2016/0348741 A1 | 12/2016 | Niemiec et al. |
| 2017/0050508 A1 | 2/2017 | Pritchard et al. |
| 2017/0248196 A1 | 8/2017 | Turner et al. |
| 2017/0328470 A1 | 11/2017 | Pohl et al. |
| 2017/0368925 A1 | 12/2017 | Maki |
| 2018/0100564 A1 | 4/2018 | Fliearman et al. |
| 2018/0106365 A1 | 4/2018 | Tsukizaki et al. |
| 2018/0149247 A1* | 5/2018 | Rekow ................ F16H 37/086 |
| 2018/0172124 A1 | 6/2018 | Valente et al. |
| 2018/0186230 A1 | 7/2018 | Fukuda et al. |
| 2018/0236864 A1 | 8/2018 | Imamura et al. |
| 2018/0238443 A1 | 8/2018 | Aulin et al. |
| 2018/0244145 A1 | 8/2018 | Ohnemus et al. |
| 2018/0298993 A1 | 10/2018 | Fliearman et al. |
| 2019/0084555 A1 | 3/2019 | Omura et al. |
| 2019/0160936 A1 | 5/2019 | Lubben et al. |
| 2019/0176806 A1 | 6/2019 | Trent |
| 2019/0219022 A1 | 7/2019 | Patil et al. |
| 2019/0344655 A1 | 11/2019 | Pettersson |
| 2019/0351751 A1 | 11/2019 | Sato et al. |
| 2020/0331337 A1 | 10/2020 | Fliearman et al. |
| 2020/0331338 A1 | 10/2020 | Fliearman et al. |
| 2020/0332754 A1 | 10/2020 | Fliearman et al. |
| 2020/0332756 A1 | 10/2020 | Fliearman et al. |
| 2020/0332757 A1 | 10/2020 | Fliearman et al. |
| 2020/0332864 A1 | 10/2020 | Fliearman et al. |
| 2020/0332865 A1 | 10/2020 | Fliearman et al. |
| 2020/0332866 A1 | 10/2020 | Fliearman et al. |
| 2020/0332867 A1 | 10/2020 | Fliearman et al. |
| 2020/0332868 A1 | 10/2020 | Fliearman et al. |

FOREIGN PATENT DOCUMENTS

| | | |
|---|---|---|
| DE | 19745995 A1 | 9/1998 |
| DE | 19927521 A1 | 6/2000 |
| DE | 19911924 A1 | 9/2000 |
| DE | 19923316 A1 | 11/2000 |
| DE | 10003741 A1 | 4/2001 |
| DE | 10103726 A1 | 8/2002 |
| DE | 102006037576 A1 | 4/2008 |
| DE | 102010030570 A1 | 12/2011 |
| DE | 102010030571 A1 | 12/2011 |
| DE | 102010060140 A1 | 4/2012 |
| DE | 102011080068 A1 | 1/2013 |
| DE | 102011089708 A1 | 6/2013 |
| DE | 102011089709 A1 | 6/2013 |
| DE | 102011089710 A1 | 6/2013 |
| DE | 112011103973 T5 | 10/2013 |
| DE | 102008045202 A1 | 3/2014 |
| DE | 102013203009 A1 | 8/2014 |
| DE | 102013012747 A1 | 9/2014 |
| DE | 102013206970 A1 | 10/2014 |
| DE | 102013209022 A1 | 11/2014 |
| DE | 102014200720 A1 | 2/2015 |
| DE | 102014200723 B3 | 2/2015 |
| DE | 102013219948 A1 | 4/2015 |
| DE | 102017203026 A1 | 8/2017 |
| DE | 102017204269 A1 | 9/2017 |
| DE | 102020204705 A1 | 10/2020 |
| DE | 102020204795 A1 | 10/2020 |
| EP | 0384808 A1 | 9/1991 |
| EP | 645271 B1 | 3/1995 |
| EP | 0391386 B1 | 9/1995 |
| EP | 2272702 A2 | 1/2011 |
| EP | 2664785 | 11/2013 |
| EP | 1069310 B4 | 3/2014 |
| GB | 650564 | 2/1951 |
| GB | 2506199 A | 3/2014 |
| JP | 2015116004 A | 6/2015 |
| WO | 1999023398 A2 | 5/1999 |
| WO | 200100088369 A1 | 11/2001 |
| WO | 200700107458 | 9/2007 |
| WO | 2012078203 A1 | 6/2012 |

OTHER PUBLICATIONS

NTN Automotive Sales Headquarters, Compact Clutch Integrated Pulley for Alternators, NTN Technical Review No. 75,2007.

Harmonic Drive LLC, Harmonic Planetary Precision Gearing & Motion Control, Product Brochure, Mar. 2006.

Ioan-Adrian Viorel et al., Integrated Starter-Generators For Automotive Applications, Technical University of Cluj-Romania, Dept. of Electrical Machines, vol. 45, No. 3, 2004.

North Atalantic Starter, Starter Drives Explained, Northatlan.com, 2005.

German Search Report for application No. 1020172030267 dated Aug. 4, 2017.

German Search Report for application No. 1020182189080 dated May 27, 2019.

German Search Report for application No. 1020182214956 dated May 28, 2019.

German Search Report for application No. 1020182180784 dated Jun. 4, 2019 .

German Search Report for application No. 1020202046468 dated Sep. 1, 2020.

German Search Report for application No. 1020202047057 dated Sep. 1, 2020.

German Search Report for application No. 1020202047952 dated Sep. 2, 2020.

German Search Report for application No. 1020202047049 dated Sep. 3, 2020.

German Search Report for application No. 1020202047065 dated Sep. 3, 2020.

German Search Report for application No. 1020202049433 dated Sep. 4, 2020.

German Search Report for application No. 1020202030634 dated Sep. 4, 2020.

German Search Report for application No. 1020202046425 dated Sep. 4, 2020.

USPTO Final Office Action dated Mar. 8, 2019 for Utility U.S. Appl. No. 15/056,767.

USPTO Final Office Action dated Jun. 11, 2018 for Utility U.S. Appl. No. 15/056,767.

USPTO Non-Final Office Action dated Sep. 9, 2019 for Utility U.S. Appl. No. 15/834,356.

USPTO Non-Final Office Action dated Nov. 2, 2017 for Utility U.S. Appl. No. 15/056,767.

USPTO Non-Final Office Action dated Sep. 28, 2018 for Utility U.S. Appl. No. 15/056,767.

USPTO Non-Final Office Action dated Nov. 1, 2018 for Utility U.S. Appl. No. 15/825,520.

USPTO Non-Final Office Action dated Feb. 25, 2019 for Utility U.S. Appl. No. 15/834,356.

USPTO Non-Final Office Action dated Mar. 4, 2020 for Utility U.S. Appl. No. 16/385,934.

USPTO Non-Final Office Action dated Jun. 19, 2020 for Utility U.S. Appl. No. 16/386,075.

USPTO Non-Final Office Action dated Aug. 24, 2020 for Utility U.S. Appl. No. 16/385,964.

USPTO Non-Final Office Action dated Aug. 24, 2020 for Utility U.S. Appl. No. 16/385,784.

Deere & Company, Utility U.S. Appl. No. 17/032,114, filed Sep. 25, 2020.

Deere & Company, Utility U.S. Appl. No. 16/840,008, filed Apr. 3, 2020.

Deere & Company, Utility U.S. Appl. No. 16/887,998, filed May 29, 2020.

Deere & Company, Utility U.S. Appl. No. 16/887,973, filed May 29, 2020.

(56) References Cited

OTHER PUBLICATIONS

German Search Report issued in German Application No. 102021113924.4 dated Sep. 30, 2021. (7 pages).
USPTO non-final office action issued in pending Utility U.S. Appl. No. 16/386,052 dated Oct. 30, 2020.
USPTO non-final office action issued in pending Utility U.S. Appl. No. 16/385,860 dated Nov. 4, 2020.
USPTO non-final office action issued in pending Utility U.S. Appl. No. 16/887,973 dated Jan. 31, 2022.
German Search Report issued in application No. DE102021209339.6 dated Feb. 15, 2022 (08 pages).

* cited by examiner

MULTI-MODE INTEGRATED STARTER-GENERATOR DEVICE WITH UNIDIRECTIONAL INPUT

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicle power systems, including arrangements for starting mechanical power equipment and generating electric power therefrom.

BACKGROUND OF THE DISCLOSURE

Work vehicles, such as those used in the agriculture, construction and forestry industries, and other conventional vehicles may be powered by an internal combustion engine (e.g., a diesel engine), although it is becoming more common for mixed power sources (e.g., engines and electric motors) to be employed. In any case, engines remain the primary power sources of work vehicles and require mechanical input from a starter to initiate rotation of the crankshaft and reciprocation of the pistons within the cylinders. Torque demands for starting an engine are high, particularly so for large diesel engines common in heavy-duty machines.

Work vehicles additionally include subsystems that require electric power. To power these subsystems of the work vehicle, a portion of the engine power may be harnessed using an alternator or generator to generate AC or DC power. The battery of the work vehicle is then charged by inverting the current from the alternator. Torque demands for generating current from the running engine are significantly lower than for engine start-up. In order to appropriately transfer power between the engine and battery to both start the engine and generate electric power, a number of different components and devices are typically required, thereby raising issues with respect to size, cost, and complexity.

SUMMARY OF THE DISCLOSURE

This disclosure provides a combined engine starter and electric power generator device with an integral transmission, such as may be used in work vehicles for engine cold start and to generate electric power, thus serving the dual purposes of an engine starter and an alternator with more robust power transmission to and from the engine, including utilizing a common direction of rotation for both cranking (or power delivery) and generation.

In one aspect, the disclosure provides a combination starter-generator device for a work vehicle having an engine with an engine crankshaft configured to rotate in a first rotational direction. The combination starter-generator device includes an electric machine with an electric machine shaft configured to rotate in the first rotational direction and a power transmission assembly including a drive shaft and configured to transfer power between the electric machine and the engine. The power transmission assembly includes a planetary gear set with a first planetary gear set stage coupled to the electric machine shaft and a second planetary gear set stage coupled to the first planetary gear set stage. One or more of the first planetary gear set stage and the second planetary gear set stage include an idler gear, and one or more of the first planetary gear set stage and the second planetary gear set stage include a ring gear coupled to the engine crankshaft. The power transmission assembly further includes a clutch arrangement with at least one clutch selectively coupled to one or more of the first planetary gear set stage and the second planetary gear set stage to effect at least one delivery mode in which power flows in a first power flow direction and at least one generation mode in which power flows in a second power flow direction. In the at least one delivery mode, one or more of the first planetary gear set stage and the second planetary gear set stage receives input power in the first rotational direction from the electric machine via the electric machine shaft and outputs power in the first rotational direction to the engine crankshaft as the first power flow direction. In the at least one generation mode, one or more of the first planetary gear set stage and the second planetary gear set stage receives input power in the first rotational direction from the engine crankshaft and outputs power in the first rotational direction to the electric machine via the electric machine shaft as the second power flow direction.

In another aspect, the disclosure provides a power transmission assembly of a combination starter-generator device for a work vehicle and configured to transfer rotational power between an engine with a crankshaft and an electric machine with an electric machine shaft. The power transmission assembly includes a drive shaft coupled to the electric machine shaft and configured to rotate in a first rotational direction and a planetary gear set including a first planetary gear set stage coupled to the drive shaft and a second planetary gear set stage coupled to the first planetary gear set stage. One or more of the first planetary gear set stage and the second planetary gear set stage include an idler gear, and one or more of the first planetary gear set stage and the second planetary gear set stage include a ring gear coupled to the engine crankshaft. The power transmission assembly further includes a clutch arrangement with at least one clutch selectively coupled to one or more of the first planetary gear set stage and the second planetary gear set stage to effect at least one delivery mode in which power flows in a first power flow direction and at least one generation mode in which power flows in a second power flow direction. In the at least one delivery mode, one or more of the first planetary gear set stage and the second planetary gear set stage receives input power in the first rotational direction from the electric machine via the drive shaft and outputs power in the first rotational direction to the engine crankshaft as the first power flow direction. In the at least one generation mode, one or more of the first planetary gear set stage and the second planetary gear set stage receives input power in the first rotational direction from the engine crankshaft and outputs power in the first rotational direction to the electric machine via the drive shaft as the second power flow direction.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
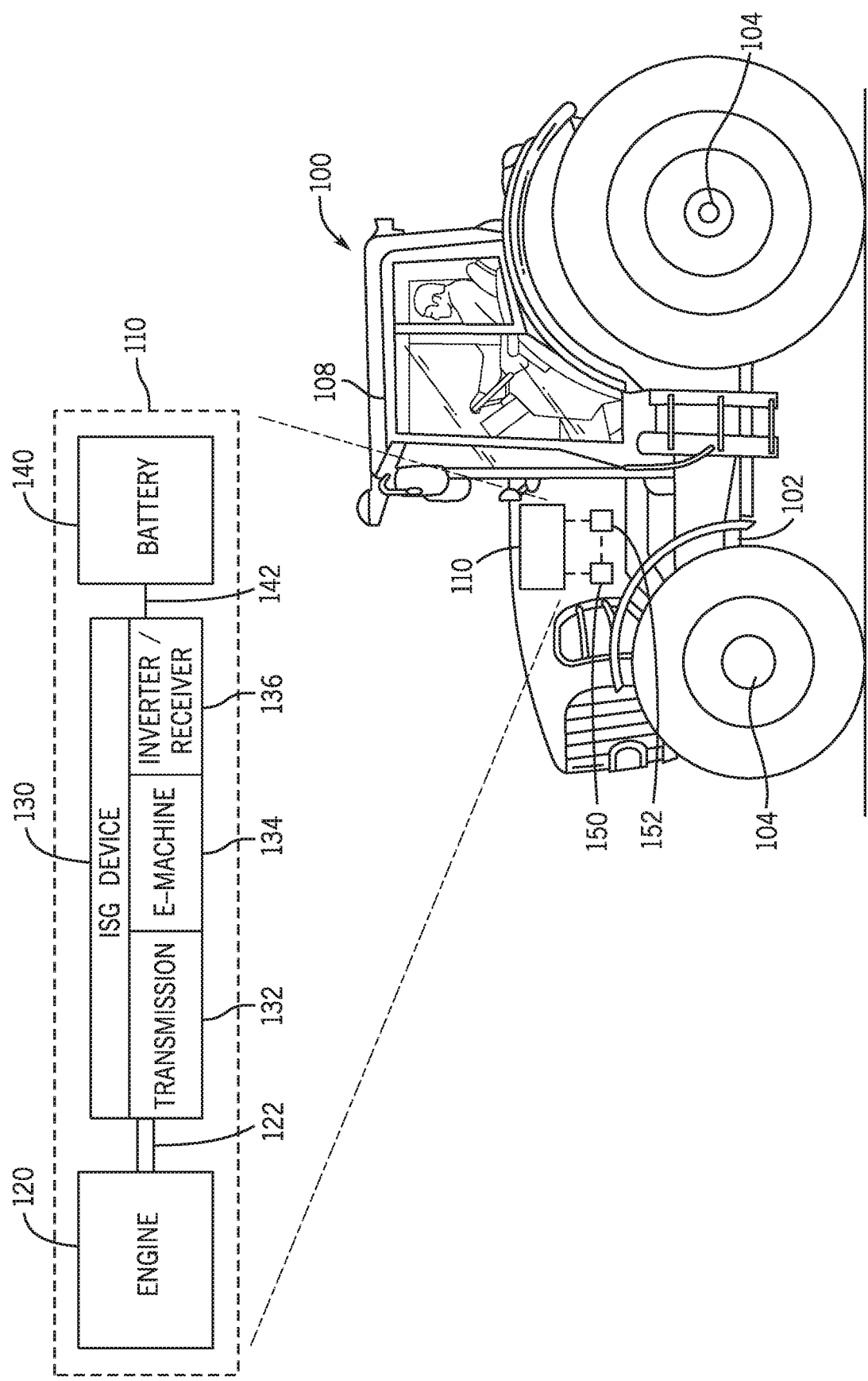
FIG. 1 is a schematic side view of an example work vehicle in the form of an agricultural tractor in which the disclosed integrated starter-generator device may be used.

The following describes one or more example embodiments of the disclosed starter-generator device, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, the term "axial" refers to a dimension that is generally parallel to an axis of rotation, axis of symmetry, or centerline of a component or components. For example, in a cylinder or disc with a centerline and opposite, generally circular ends or faces, the "axial" dimension may refer to the dimension that generally extends in parallel to the centerline between the opposite ends or faces. In certain instances, the term "axial" may be utilized with respect to components that are not cylindrical (or otherwise radially symmetric). For example, the "axial" dimension for a rectangular housing containing a rotating shaft may be viewed as a dimension that is generally in parallel with the rotational axis of the shaft. Furthermore, the term "radially" as used herein may refer to a dimension or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial dimension. Additionally, the term "circumferential" may refer to a collective tangential dimension that is perpendicular to the radial and axial dimensions about an axis.

Many conventional vehicle power systems include an internal combustion engine and/or one or more batteries (or other chemical power source) that power various components and subsystems of the vehicle. In certain electric vehicles, a bank of batteries powers the entire vehicle including the drive wheels to impart motion to the vehicle. In hybrid gas and electric vehicles, the motive force may alternate between engine and electric motor power, or the engine power may be supplemented by electric motor power. In still other conventional vehicles, the electric power system is used to initiate engine start up and to run the non-drive electric systems of the vehicle. In the latter case, the vehicle typically has a starter motor that is powered by the vehicle battery to turn the engine crankshaft to move the pistons within the cylinders. In further scenarios, the electric power system may provide a boost to an operating engine.

Some engines (e.g., diesel engines) initiate combustion by compression of the fuel, while other engines rely on a spark generator (e.g., spark plug), which is powered by the battery. Once the engine is operating at a sufficient speed, the power system may harvest the engine power to power the electric system as well as to charge the battery. Typically, this power harvesting is performed with an alternator or other type of power generator. The alternator converts alternating current (AC) power to direct current (DC) power usable by the battery and vehicle electric components by passing the AC power through an inverter (e.g., diode rectifier). Conventional alternators harness power from the engine by coupling a rotor of the alternator to an output shaft of the engine (or a component coupled thereto). Historically this was accomplished by the use of a dedicated belt, but in some more modern vehicles the alternator is one of several devices that are coupled to (and thus powered by) the engine via a single "serpentine" belt.

In certain applications, such as in certain heavy-duty machinery and work vehicles, it may be disadvantageous to have a conventional set-up with separate starter and generator components. Such separate components require separate housings, which may require separate sealing or shielding from the work environment and/or occupy separate positions within the limited space of the engine compartment. Other engine compartment layout complexities may arise as well.

The following describes one or more example implementations of an improved vehicle power system that addresses one or more of these (or other) matters with conventional systems. In one aspect, the disclosed system includes a combination or integrated device that performs the engine cranking function of a starter motor and the electric power generating function of a generator. The device is referred to herein as an integrated starter-generator device ("ISG" or "starter-generator"). This terminology is used herein, at least in some implementations of the system, to be agnostic to the type of power (e.g., AC or DC current) generated by the device. In some implementations, the starter-generator device may function to generate electricity in a manner of what persons of skill in the art may consider a "generator" device that produces DC current directly. However, as used herein, the term "generator" shall mean producing electric power of static or alternating polarity (e.g., AC or DC). Thus, in a special case of the starter-generator device, the electric power generating functionality is akin to that of a conventional alternator, and it generates AC power that is subsequently rectified to DC power, either internally or externally to the starter-generator device.

In certain embodiments, the starter-generator device may include within its housing a power transmission assembly with a gear set that couples to a crankshaft of the engine. The gear set may take any of various forms including arrangements with enmeshing spur or other gears as well as arrangements with one or more planetary gear sets. Large gear reduction ratios may be achieved by the transmission assembly such that a single electric machine (i.e., motor or generator) may be used and operated at suitable speeds for one or more types of engine start up, as well as electric power generation.

Further, in certain embodiments, the power transmission assembly of the starter-generator device may have a power transmission assembly that automatically and/or selectively shifts gear ratios (e.g., shifts between power flow paths having different gear ratios). By way of example, the transmission assembly may include one or more engagement components (or clutches arrangements) that engage or disengage automatically or upon command to effect power transmission through various power flow paths in unidirectional or bi-directional configurations. The gear set and clutch arrangements may also be configured and arranged to provide power transmission between the electric machine and the engine at one of two (or three or more) different speeds, e.g., according to different gear ratios. The selection of speed may provide additional functionality and flexibility for the power transmission assembly.

In examples detailed in greater detail below, the combination starter-generator device includes the power transmission assembly having a gear set and clutch arrangement that enables various operational modes in both power flow directions. Moreover, the power transmission assembly enable both of the engine and electric machine to operate in each power flow direction with common input and output rotational directions. In other words, the power transmission assembly enables the electric machine to rotate in the same direction for cranking, boost, and generation. Such gear sets of the power transmission assemblies enable such rotational relationships within a limited space.

Referring to the drawings, an example work vehicle power system as a drivetrain assembly will be described in detail. As will become apparent from the discussion herein, the disclosed system may be used advantageously in a variety of settings and with a variety of machinery. For example, referring now to FIG. 1, the power system (or drivetrain assembly) 110 may be included in a work vehicle 100, which is depicted as an agricultural tractor. It will be understood, however, that other configurations may be possible, including configurations with work vehicle 100 as a different kind of tractor, or as a work vehicle used for other aspects of the agriculture industry or for the construction and forestry industries (e.g., a harvester, a log skidder, a motor grader, and so on). It will further be understood that aspects of the power system 110 may also be used in non-work vehicles and non-vehicle applications (e.g., fixed-location installations).

Briefly, the work vehicle 100 has a main frame or chassis 102 supported by ground-engaging wheels 104, at least the front wheels of which are steerable. The chassis 102 supports the power system 110 and an operator cabin 108 in which operator interface and controls (e.g., various joysticks, switches levers, buttons, touchscreens, keyboards, speakers and microphones associated with a speech recognition system) are provided.

As schematically shown, the power system 110 includes an engine 120, an integrated starter-generator device 130, a battery 140, and a controller 150. The engine 120 may be an internal combustion engine or other suitable power source that is suitably coupled to propel the work vehicle 100 via the wheels 104, either autonomously or based on commands from an operator. The battery 140 may represent any one or more suitable energy storage devices that may be used to provide electric power to various systems of the work vehicle 100.

The starter-generator device 130 couples the engine 120 to the battery 140 such that the engine 120 and battery 140 may selectively interact in at least two modes, such as the four modes described below. In a first (or cold engine start) mode, the starter-generator device 130 converts electric power from the battery 140 into mechanical power to drive the engine 120 at a relatively low speed and high torque, e.g., during a relatively cold engine start up. In a second (or warm engine start) mode, the starter-generator device 130 converts electric power from the battery 140 into mechanical power to drive the engine 120 at a relatively high speed and low torque, e.g., during a relatively warm engine start up. In a third (or boost) mode, the starter-generator device 130 converts electric power from the battery 140 into mechanical power to drive the engine 120 to provide an engine boost. In a fourth (or generation) mode, the starter-generator device 130 converts mechanical power from the engine 120 into electric power to charge the battery 140, as well as to provide power to auxiliary vehicle components. Additional details regarding operation of the starter-generator device 130 during the engine start modes, the boost mode, and the generation mode are provided below.

As introduced above, the controller 150 may be considered part of the power system 110 to control various aspects of the work vehicle 100, particularly characteristics of the power system 110. The controller 150 may be a work vehicle electronic controller unit (ECU) or a dedicated controller. In some embodiments, the controller 150 may be configured to receive input commands and to interface with an operator via a human-machine interface or operator interface (not shown) and from various sensors, units, and systems onboard or remote from the work vehicle 100; and in response, the controller 150 generates one or more types of commands for implementation by the power system 110 and/or various systems of work vehicle 100.

Generally, the controller 150 may be configured as computing devices with associated processor devices and memory architectures, as hydraulic, electrical or electro-hydraulic controllers, or otherwise. As such, the controller 150 may be configured to execute various computational and control functionality with respect to the power system 110 (and other machinery). The controller 150 may be in electronic, hydraulic, or other communication with various other systems or devices of the work vehicle 100. For example, the controller 150 may be in electronic or hydraulic communication with various actuators, sensors, and other devices within (or outside of) the work vehicle 100, including various devices associated with the power system 110. Generally, the controller 150 generates the command signals based on operator input, operational conditions, and routines and/or schedules stored in the memory. For example, the operator may provide inputs to the controller 150 via an operator input device that dictates the appropriate mode, or that at least partially defines the operating conditions in which the appropriate mode is selected by the controller 150. In some examples, the controller 150 may additionally or alternatively operate autonomously without input from a human operator. The controller 150 may communicate with other systems or devices (including other controllers) in various known ways, including via a CAN bus (not shown), via wireless or hydraulic communication means, or otherwise.

Additionally, power system 110 and/or work vehicle 100 may include a hydraulic system 152 with one or more electro-hydraulic control valves (e.g., solenoid valves) that facilitate hydraulic control of various vehicle systems, particularly aspects of the starter-generator device 130. The hydraulic system 152 may further include various pumps, lines, hoses, conduits, tanks, and the like. The hydraulic system 152 may be electrically activated and controlled according to signals from the controller 150. Although in some examples the hydraulic system 152 may be utilized to engage and/or disengage clutches within the starter-generator device 130, e.g., by applying and releasing hydraulic pressure based on signals from the controller 150 for one or more clutch actuators; in general, the clutches described below may be actuated with electric solenoids.

In one example, the starter-generator device 130 includes a power transmission assembly (or transmission) 132, an electric machine or motor 134, and an inverter/rectifier device 136, each of which may be operated according to command signals from the controller 150. The power transmission assembly 132 enables the starter-generator device 130 to interface with the engine 120, particularly via a crankshaft (or an auxiliary drive shaft or other engine power transfer element) 122 of the engine 120. The power transmission assembly 132 may include one or more gear sets in various configurations to provide suitable power flows and gear reductions, as described below. The power transmission assembly 132 variably interfaces with the electric machine 134 in two different power flow directions such that the electric machine 134 operates as a motor during the engine start and boost modes and as a generator during the generation mode. In one example, discussed below, the power transmission assembly 132 is coupled to the electric machine 134 via a power transfer belt arrangement in one example, although other power transfer mechanisms may include a drop gearbox, chain, or an inline motor. This arrangement, along with the multiple gear ratios provided by the power transmission assembly 132, permits the electric machine 134 to operate within optimal speed and torque ranges in both power flow directions. The inverter/rectifier device 136 enables the starter-generator device 130 to interface with the battery 140, such as via direct hardwiring or a vehicle power bus 142. In one example, the inverter/rectifier device 136 inverts DC power from the battery 140 into AC power during the engine start modes and rectifies AC power to DC power in the generation mode. In some embodiments, the inverter/rectifier device 136 may be a separate component instead of being incorporated into the starter-generator device 130. Although not shown, the power system 110 may also include a suitable voltage regulator, either incorporated into the starter-generator device 130 or as a separate component.

Figure 2:
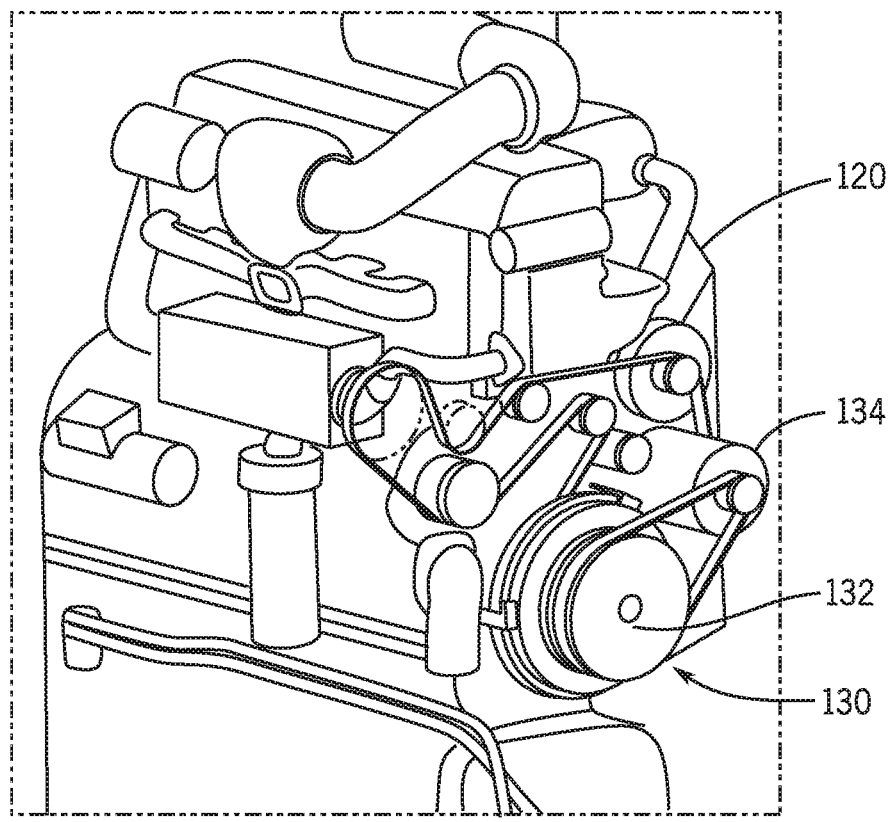
FIG. 2 is a simplified partial isometric view of an engine of the work vehicle of FIG. 1 showing an example mounting location for an example starter-generator device.

Reference is briefly made to FIG. 2, which depicts a simplified partial isometric view of an example mounting location of the starter-generator device 130 relative to the engine 120. In this example, the integrated starter-generator device 130 mounts directly and compactly to the engine 120 so as not to project significantly from the engine 120 (and thereby enlarge the engine compartment space envelope) or interfere with various plumbing lines and access points (e.g., oil tubes and fill opening and the like). Notably, the starter-generator device 130 may generally be mounted on or near the engine 120 in a location suitable for coupling to an engine power transfer element (e.g., crankshaft 122 as introduced in FIG. 1).

Figure 3:
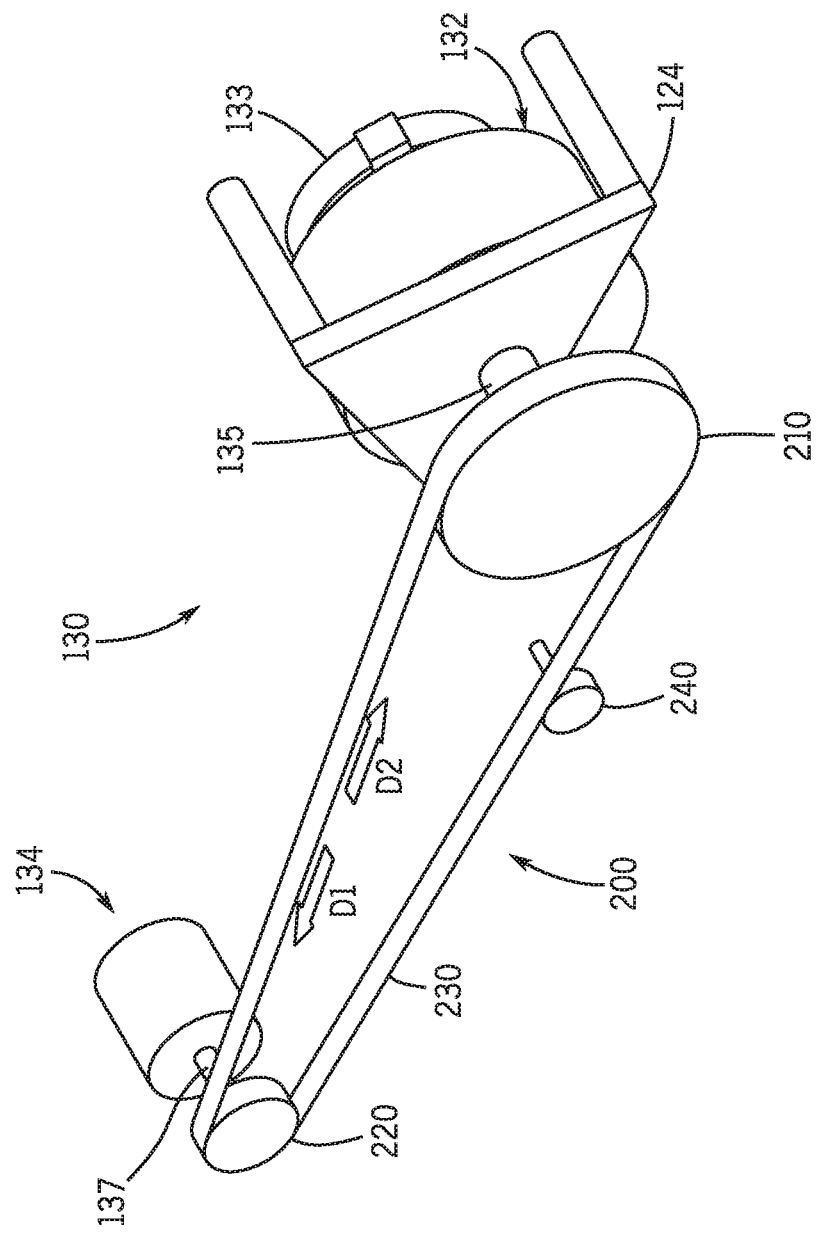
FIG. 3 is a schematic diagram of a portion of a power transfer arrangement of the work vehicle of FIG. 1 having an example starter-generator device.

Reference is additionally made to FIG. 3, which is a simplified schematic diagram of a power transfer belt arrangement 200 between the power transmission assembly 132 and electric machine 134 of the starter-generator device 130. It should be noted that FIGS. 2 and 3 depict one example physical integration or layout configuration of the starter-generator device 130. Other arrangements may be provided.

The power transmission assembly 132 is mounted to the engine 120 and may be supported by a reaction plate 124. As shown, the power transmission assembly 132 includes a first power transfer element 133 that is rotatably coupled to a suitable drive element of the engine 120 (e.g., crankshaft 122 of FIG. 1) and a second power transfer element 135 in the form of a shaft extending on an opposite side of the power transmission assembly 132 from the first power transfer element 133. Similarly, the electric machine 134 is mounted on the engine 120 and includes a further power transfer element 137.

The power transfer belt arrangement 200 includes a first pulley 210 arranged on the second power transfer element 135 of the power transmission assembly 132, a second pulley 220 arranged on the power transfer element 137 of the electric machine 134, and a belt 230 that rotatably couples the first pulley 210 to the second pulley 220 for collective rotation. As described in greater detail below, during the various modes, the electric machine 134 pulls the belt 230 to rotate pullies 210, 220 in a first rotational (or clock) direction D1 or second rotational (or clock) direction D2, as appropriate, to drive the power transmission assembly 132 (and thus the engine 120) or vice versa.

As a result of the bi-directional configuration, the power transfer belt arrangement 200 may include only a single belt tensioner 240 to apply tension to a single side of the belt 230 in both directions D1, D2. In other embodiments, the power transfer belt arrangement 200 may provide a configuration with unidirectional operation and/or omit or add additional belt tensioners. Additionally, a difference in the circumferences of the first and second pullies 210, 220 provides a change in the gear ratio between the power transmission assembly 132 and the electric machine 134. In one example, the power transfer belt arrangement 200 may provide a gear ratio of between 3:1-5:1, particularly a 4:1 ratio.

Figure 5:
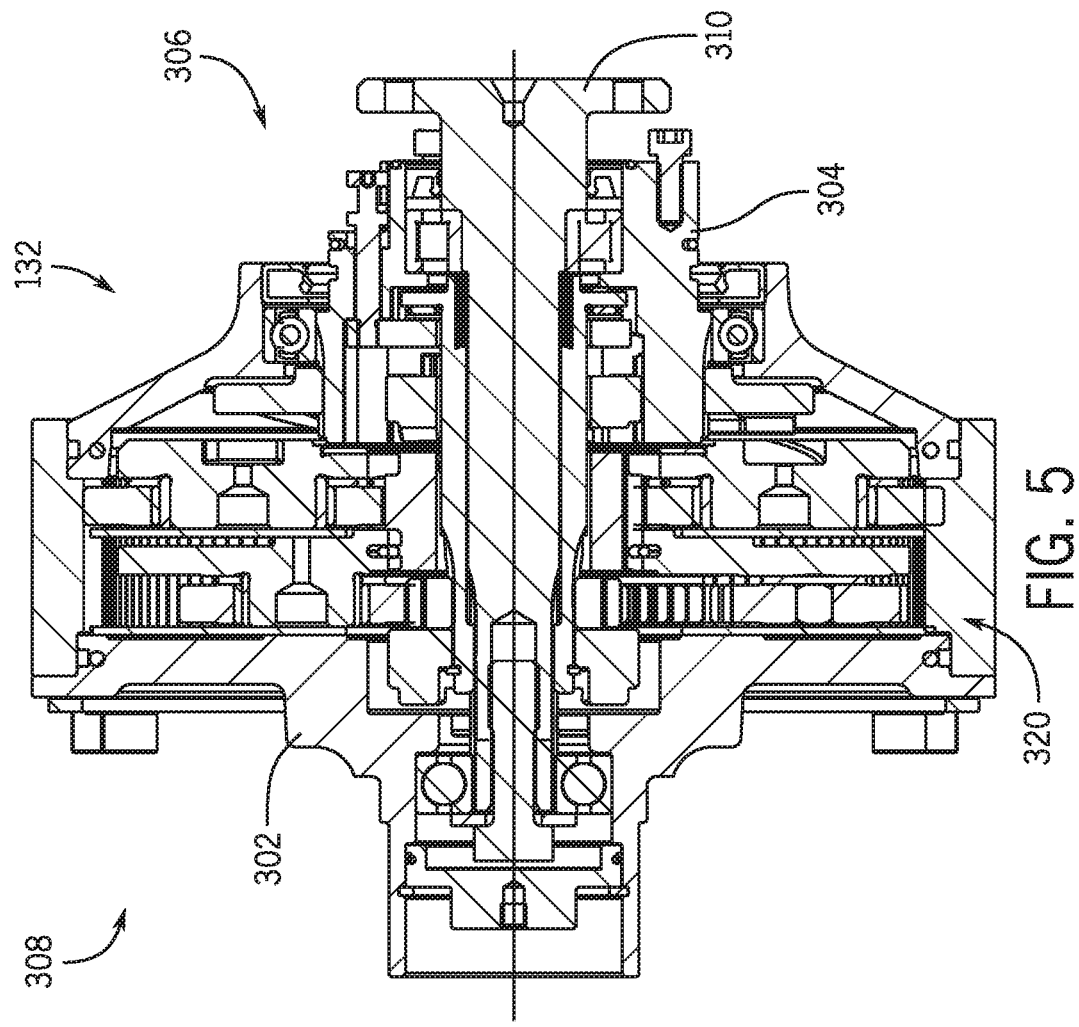
FIG. 5 is a cross-sectional view of a power transmission assembly of the example starter-generator device that may be implemented in the work vehicle of FIG. 1.
Figure 4:
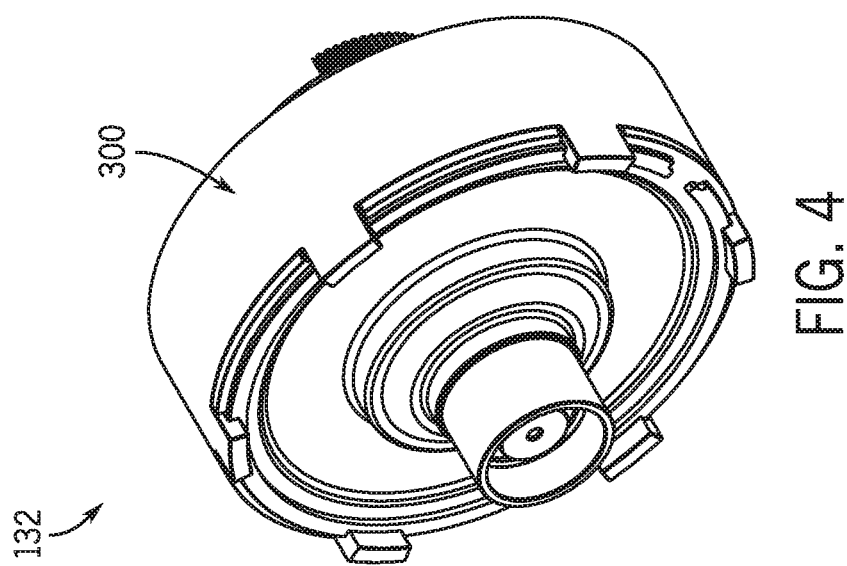
FIG. 4 is an isometric view of a power transmission assembly of the example starter-generator device that may be implemented in the work vehicle of FIG. 1.

In one example, FIGS. 4 and 5 respectively depict an engine-side isometric view and a corresponding cross-sectional view of the power transmission assembly 132 that may be implemented into the starter-generator device 130. As shown, the power transmission assembly 132 includes a housing 300 with a rotatable housing element 302 that, in this example, functions as a power transfer element of the assembly 132 and engages a corresponding power transfer element (e.g., crankshaft 122) of the engine 120. A stationary housing element 304 facilitates the mounting and securement of the power transmission assembly 132 and enables various elements of the housing 300 and the power transmission assembly 132 to rotate relative to the stationary housing element 304, e.g., on one or more sets of bearings.

As shown, the power transmission assembly 132 may be considered to be a unit with the annular housing 300 configured to house various components of the power transmission assembly 132. In the view of FIG. 5, a first side 306 of the power transmission assembly 132 is oriented towards the electric machine 134, and a second side 308 of the power transmission assembly 132 is oriented towards the engine 120.

At the first side 306, the power transmission assembly 132 includes an input shaft 310 that is coupled to the electric machine 134 (e.g., via the power transfer belt arrangement 200). In some examples, the input shaft 310 may be directly connected to the power transfer element 135 described above with reference to FIGS. 1 and 2; and in further examples, the input shaft 310 may be coupled through intermediate components, such as a flange or boss. It should be noted that, although the shaft 310 is described as an "input" shaft, it may transfer power both into and out of the power transmission assembly 132, depending on the mode, as described below. The input shaft 310 generally extends through the power transmission assembly 132 to define a primary axis of rotation.

The power transmission assembly 132 generally includes one or more planetary (or epicyclic) gear sets 320. As described below, the planetary gear set 320 is a two stage planetary gear set and generally enables the power transmission assembly 132 to interface with the electric machine 134 (e.g., via the power transfer belt arrangement 200) and the engine 120 (e.g., via direct coupling to the crankshaft 122 of the engine 120). In some embodiments, the input shaft 310 may be considered part of the planetary gear set 320. Although one example configuration of the planetary gear set 320 is described below, other embodiments may have different configurations.

Figure 6A:
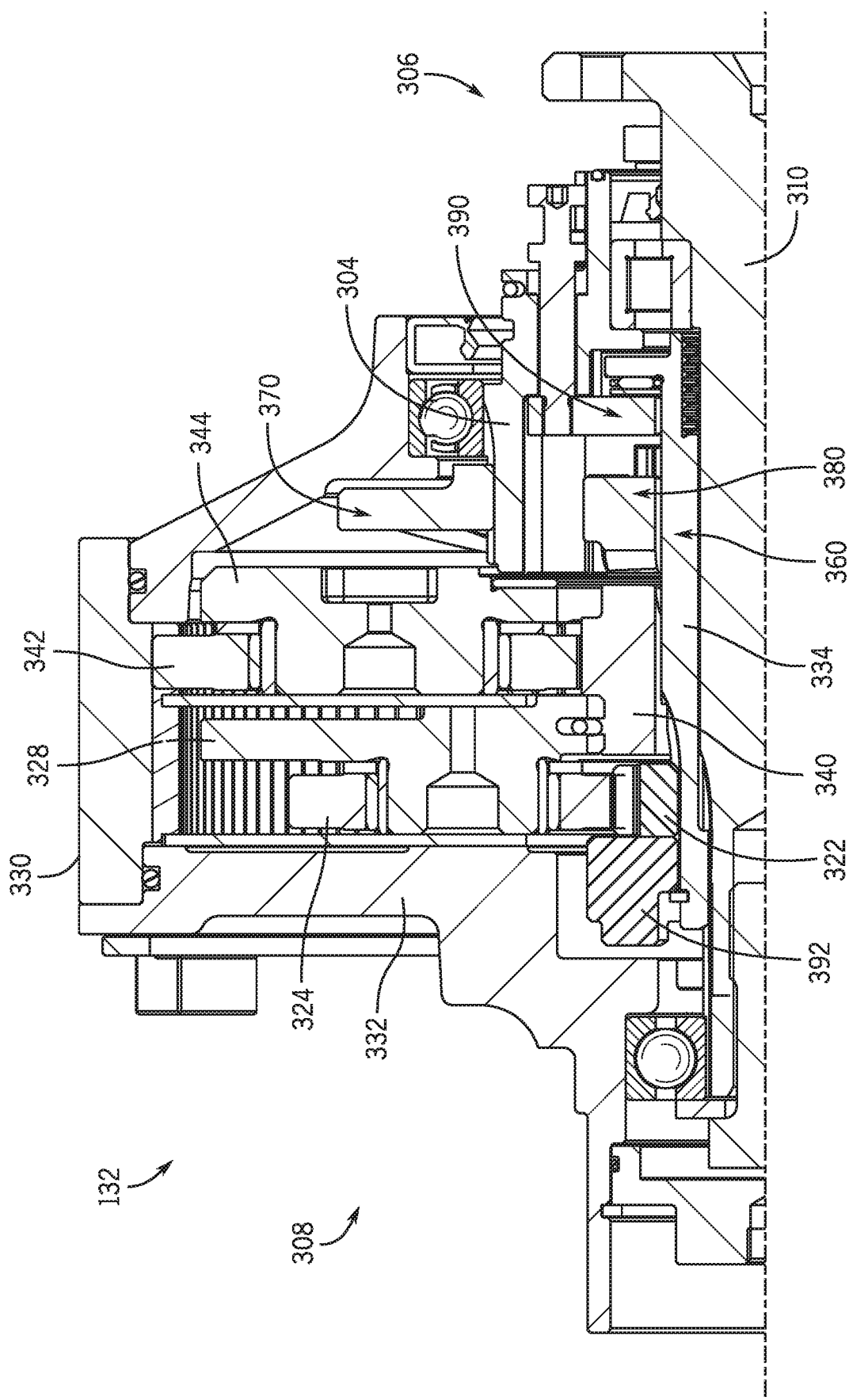
FIG. 6A is a more detailed cross-sectional view of a portion of the power transmission assembly through line 6A-6A of FIG. 8 for the example starter-generator device.
Figure 6B:
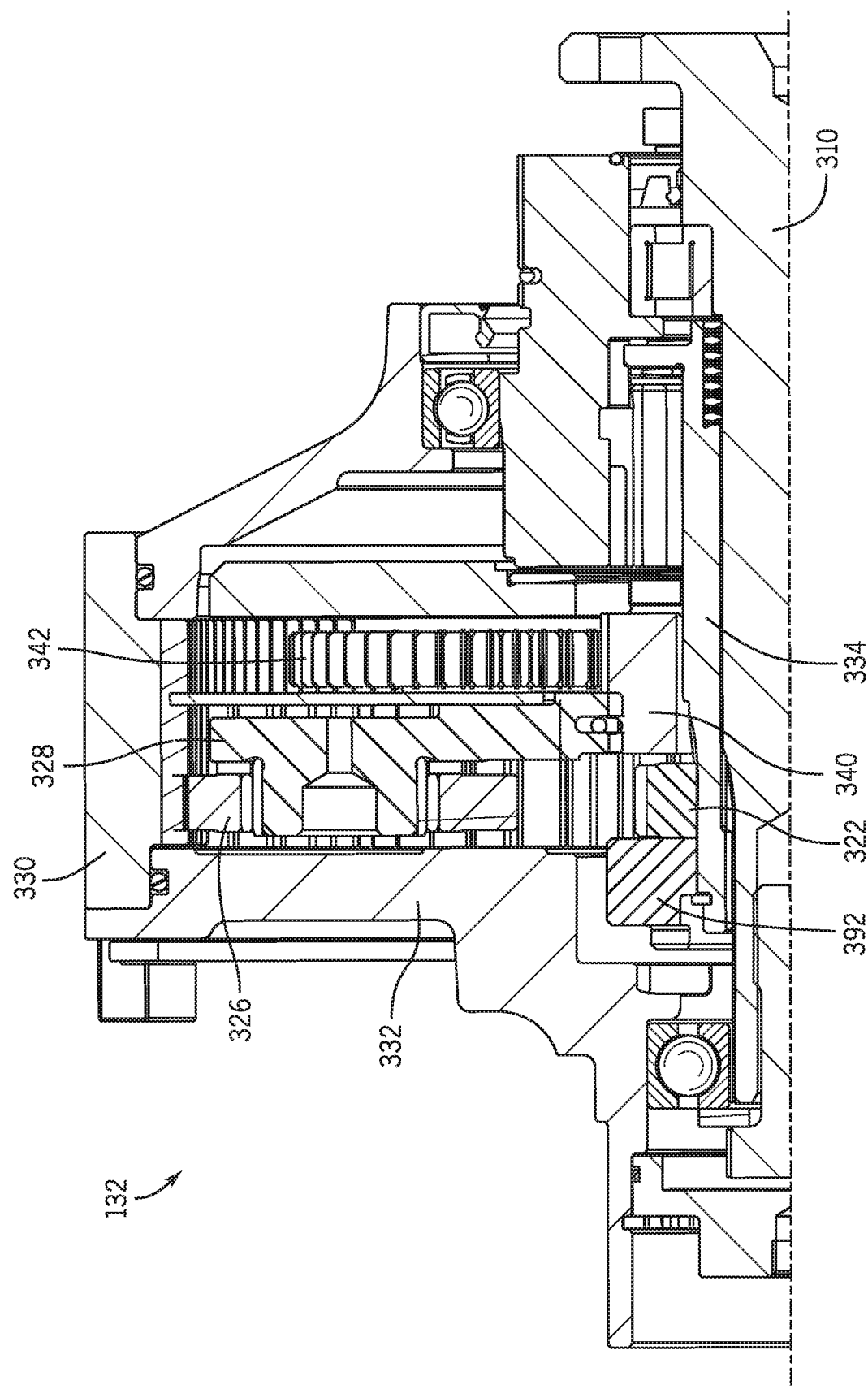
FIG. 6B is a more detailed cross-sectional view of a portion of the power transmission assembly through line 6B-6B of FIG. 8 for the example starter-generator device.
Figure 7:
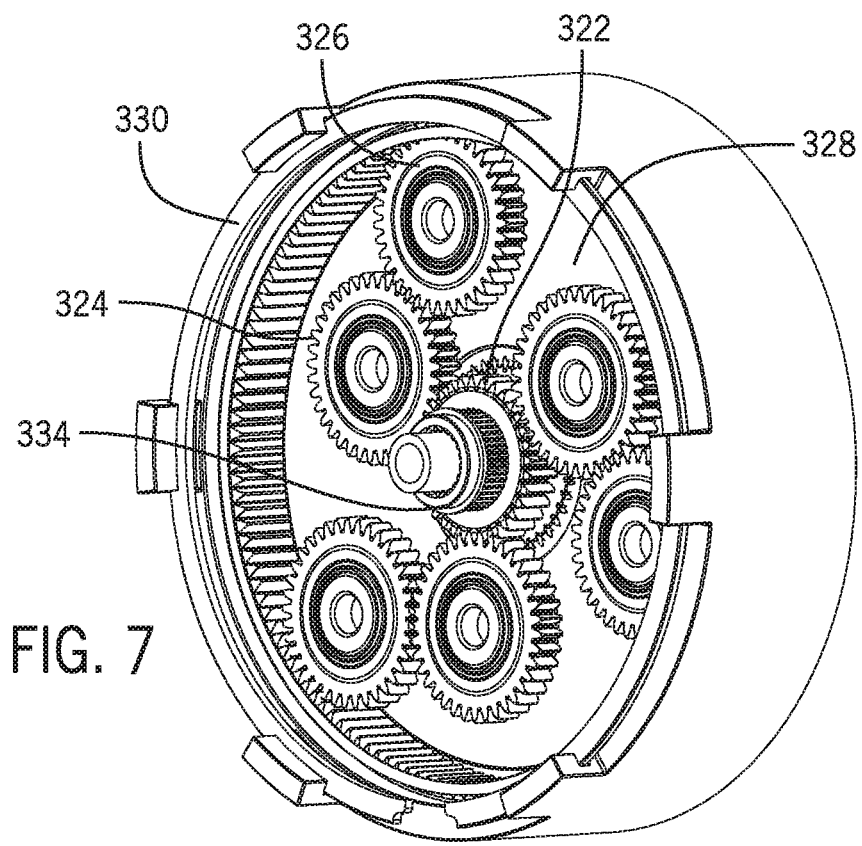
FIG. 7 is a first partial isometric view of a gear set and clutch arrangement that may be incorporated into the power transmission assembly of FIG. 5 for the example starter-generator device.
Figure 8:
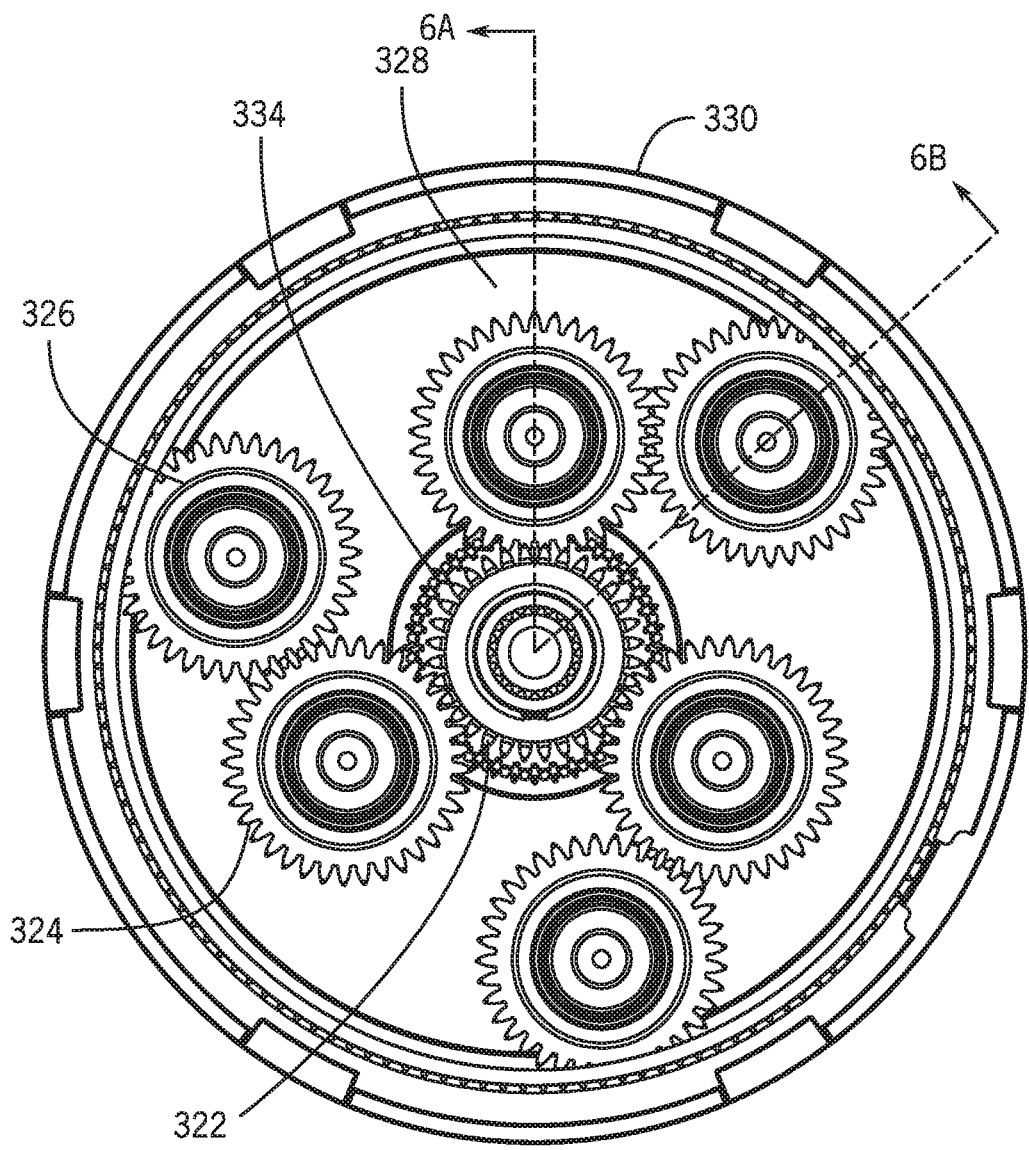
FIG. 8 is an end view of the gear set and clutch arrangement of FIG. 7 that may be incorporated into the power transmission assembly of FIG. 5 for the example starter-generator device.

Reference is additionally made to FIG. 6A and FIG. 6B, which are closer views of a portion of FIG. 5, particularly as reflected by lines 6A-6A and 6B-6B of FIG. 8, respectively. The elements of the power transmission assembly 132 are additionally depicted by FIGS. 7-18, which are referenced as appropriate in the description below. As shown, the housing 300 at least partially encloses or otherwise supports operation of the planetary gear set 320, and the stationary housing element 304 is generally cylindrical to partially circumscribe the input shaft 310 to support one or more clutch arrangements, discussed below.

The planetary gear set 320 includes a first-stage sun gear 322 mounted on a sun gear shaft 334, which in turn is mounted for rotation on the input shaft 310. In this example, the sun gear shaft 334 is generally formed by a sleeve circumscribing the input shaft 310 that extends generally through the planetary gear set 320. The first-stage sun gear 322 is splined to the sun gear shaft 334. Additionally, the first-stage sun gear 322 includes a plurality of teeth or splines on an end generally proximate to the second side 308 of the planetary gear set 320 that mesh with a set of first-stage idler gears 324, which in turn collectively circumscribe the first-stage sun gear 322. The first-stage idler gears 324 include a plurality of teeth or splines that mesh with a set of first-stage planet gears 326 that generally collectively circumscribe the first-stage idler gears 324, as well as the first-stage sun gear 322. Although the description herein refers to gears 324 as the "idler" gears, and gears 326 as the "planet" gears, the labels may be reversed and/or both sets of gears 324, 326 may be considered planet gears. In the depicted examples, the first-stage idler gears 324 are more clearly depicted by the circumferential position reflected by FIG. 6A, and the first-stage planet gears 326 are more clearly depicted by the circumferential position reflected by FIG. 6B.

The first-stage idler gears 324 and the first-stage planet gears 326 are supported by a first-stage planet carrier 328, which circumscribes the first-stage sun gear 322, as well as the input shaft 310, and is at least partially formed a radially extending, axially facing carrier plate with rows of mounting locations for receiving axles extending through and supporting the first-stage idler gears 324 and first-stage planet gears 326 for rotation. As such, in this arrangement, each of the axles respectively forms an individual axis of rotation for each of the first-stage idler gears 324 and first-stage planet gears 326, and the first-stage planet carrier 328 enables the sets of first-stage idler gears 324 and first-stage planet gears 326 to collectively rotate about the first-stage sun gear 322.

The planetary gear set 320 further includes a ring gear 330 that circumscribes the first-stage sun gear 322, the first-stage idler gears 324, and the first-stage planet gears 326. The ring gear 330 includes radially interior teeth that engage the teeth of the first-stage planet gears 326. As such, the first-stage idler gears 324 extend between, and engage with, and the first-stage sun gear 322 and the first-stage planet gears 326; and the first-stage planet gears 326 extend between, and engage with, first-stage idler gears 324 and the ring gear 330. In some embodiments, a ring gear cover 332 may be mounted within the interior of the ring gear 330. The ring gear cover 332 functions to at least partially enclose the planetary gear set 320 within the housing 300.

In effect, the ring gear 330 and ring gear cover 332 may be considered a rotatable housing element (e.g., element 302), which as noted above are positioned on bearings to rotate relative to the stationary aspects of the housing 300. With respect to the planetary gear set 320, the ring gear 330 may function as the power transfer element 133 relative to the engine 120. In particular, the ring gear 330 includes a number of castellations that extend axially about the circumference of the axial face that faces the engine 120. The castellations 334 engage and rotatably fix the ring gear 330 to the crankshaft 122 of the engine 120. The ring gear 330 may be considered an output element of the power transmission assembly 132; however, similar to the input shaft 310, the ring gear 330 may receive rotational input in both power flow directions.

Reference is briefly made to FIGS. 7 and 8, which are second (or engine) side views of the planetary gear set 320 with the ring gear cover 332 removed to depict the first-stage elements discussed above. As noted, the planetary gear set 320 includes the first-stage sun gear 322, the first-stage idler gears 324 and the first-stage planet gears 326 mounted on the first-stage planet carrier 328, and the ring gear 330.

Returning to FIG. 6, the planetary gear set 320 further includes a second-stage sun gear 340 that is generally hollow and cylindrical, and generally circumscribes the input shaft 310 and the sun gear shaft 334. In this example, the first-stage planet carrier 328 has a splined engagement with, or is otherwise fixed to, the second-stage sun gear 340. Additionally, the second-stage sun gear 340 may include a series of splines that mesh with a set of second-stage planet gears 342. The second-stage planet gears 342 are supported by a second-stage planet carrier 344 formed by a carrier plate with one or more mounting positions to rotationally support the second-stage planet gears 342. The second-stage planet gears 342 are positioned to additionally engage with the ring gear 330. As such, the second-stage planet gears 342 are positioned in between, and engage with each of, the second-stage sun gear 340 and the ring gear 330. In some examples, each second-stage planet gear 346 has a size and number of teeth to provide a different gear ratio than that of the combination of first-stage idler gears 324 and first-stage planet gears 326.

Figure 9:
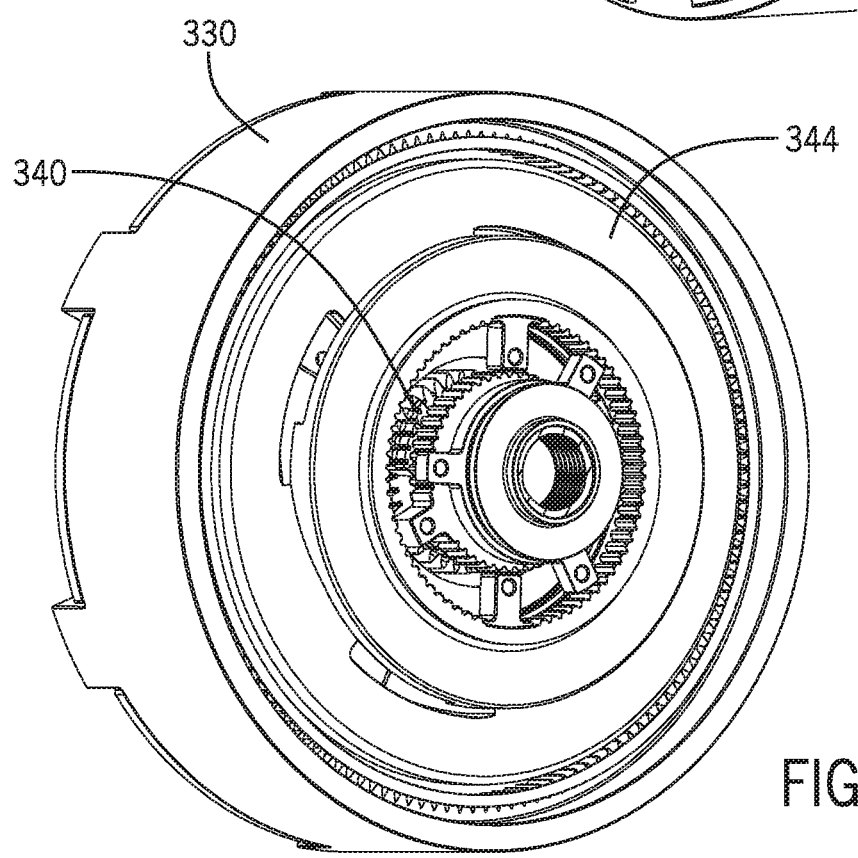
FIG. 9 is a further partial isometric side view of the gear set and clutch arrangement of FIG. 7 that may be incorporated into the power transmission assembly of FIG. 5 for the example starter-generator device.
Figure 18:
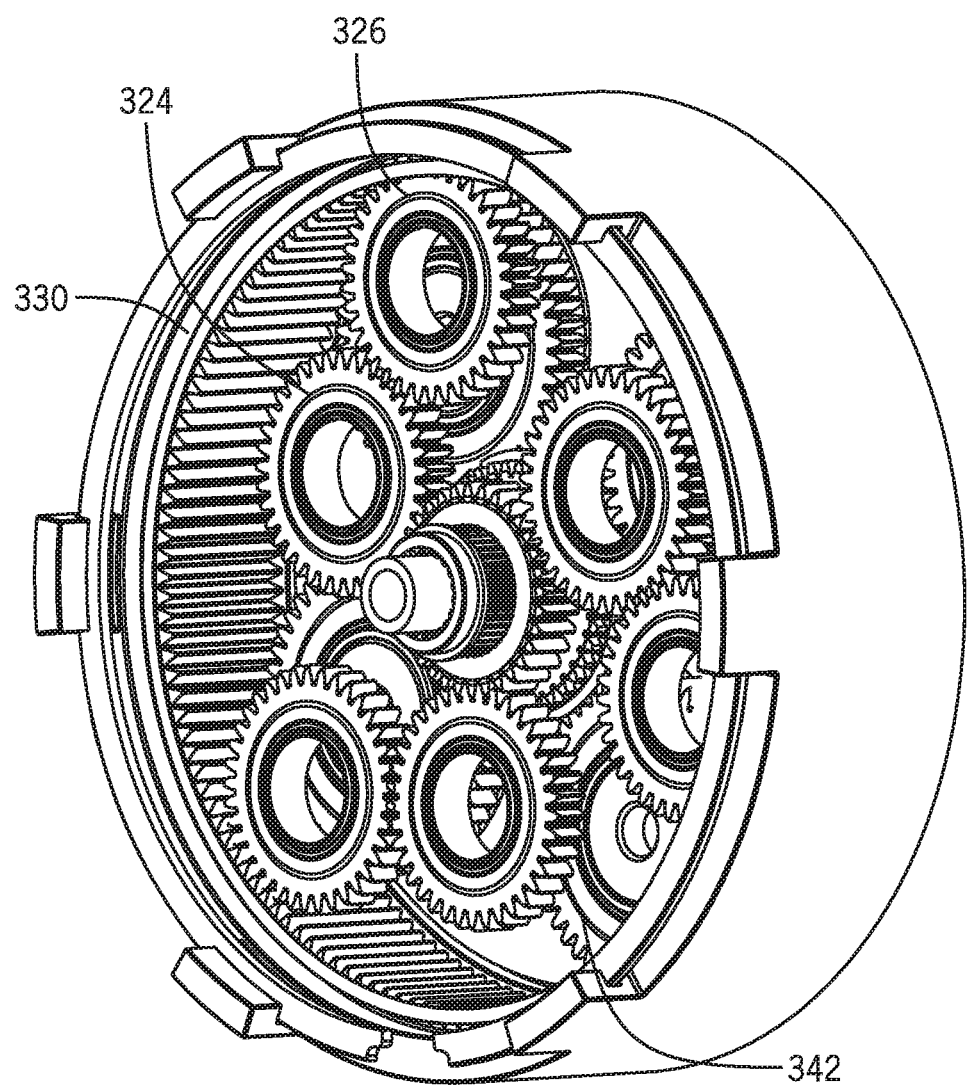
FIG. 18 is a partial isometric view depicting a portions of the gear set that may be incorporated into the power transmission assembly of FIG. 5 for the example starter-generator device.

Reference is briefly made to FIG. 9, which is a first (or electric machine) side view of the planetary gear set 320 with the housing portions removed to partially depict the second-stage elements discussed above. As noted, the planetary gear set 320 includes the second-stage sun gear 340 and second-stage planet carrier 344 that support engagement of the second-stage planet gears 342 (FIG. 6) with the ring gear 330. Such engagement is more clearly depicted by FIGS. 12 and 13, which are first (or electric machine) side isometric and end views with the second-stage planet carrier 344 removed to show the second-stage planet gears 342 extending between the second-stage sun gears 340 and the ring gear 330. Further, the view of FIG. 18 is an engine-side isometric view of the planetary gear set 320 portions of the housing 300 and the first-stage planet carrier 328 removed to more clearly depict the arrangement of the first-stage sun gear 322, the first-stage idler gears 324, the first-stage planet gears 326, the second-stage sun gear 340, the second-stage planet gears 342, and the ring gear 330.

As will now be described in greater detail, the power transmission assembly 132 additionally includes a clutch arrangement 360 configured to selectively engage and disengage various components of the planetary gear set 320 to modify the power flow through the power transmission assembly 132.

Generally, the clutch arrangement 360 includes a first (or low) clutch (or clutch apparatus) 370, a second (or mid) clutch (or clutch apparatus) 380, a third (or high) clutch (or clutch apparatus) 390. Each clutch 370, 380, 390 may be shifted between an engaged position and a disengaged position by various types of actuators (not shown). As such, the clutches 370, 380, 390 may be considered "shifting" clutches that are actively actuated to modify power flow within the power transmission assembly 132. The clutches 370, 380, 390 may be any suitable type of clutches. Similarly, the actuators may be any suitable mechanism for moving the clutches 370, 380, 390, such one or more electromechanical solenoids, hydraulic actuators, cams, and/or springs arranged within and/or exterior to the housing 300.

The clutches 370, 380, 390 may be unidirectional or bidirectional to respectively engage in one or both rotational directions (D1 or D2). In the depicted examples, clutches 370, 380 are unidirectional and clutch 390 is bidirectional.

Figure 14:
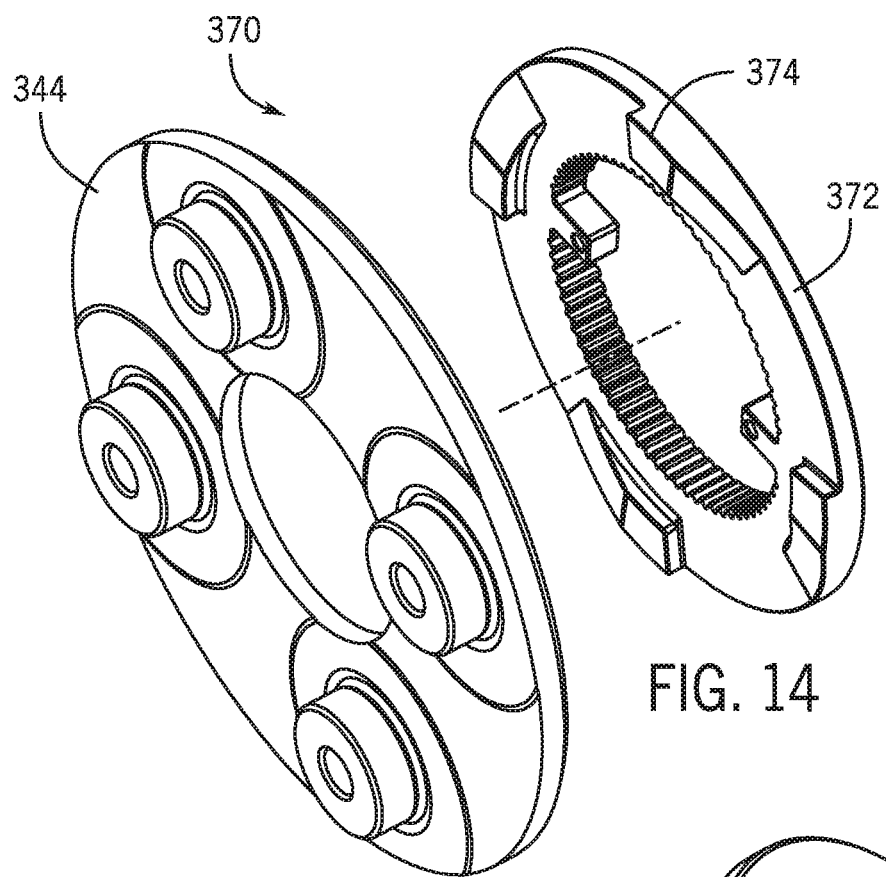
FIGS. 14 and 15 are partially exploded first and second side views of a second-stage planet carrier and a clutch that may be incorporated into the power transmission assembly of FIG. 5 for the example starter-generator device.
Figure 15:
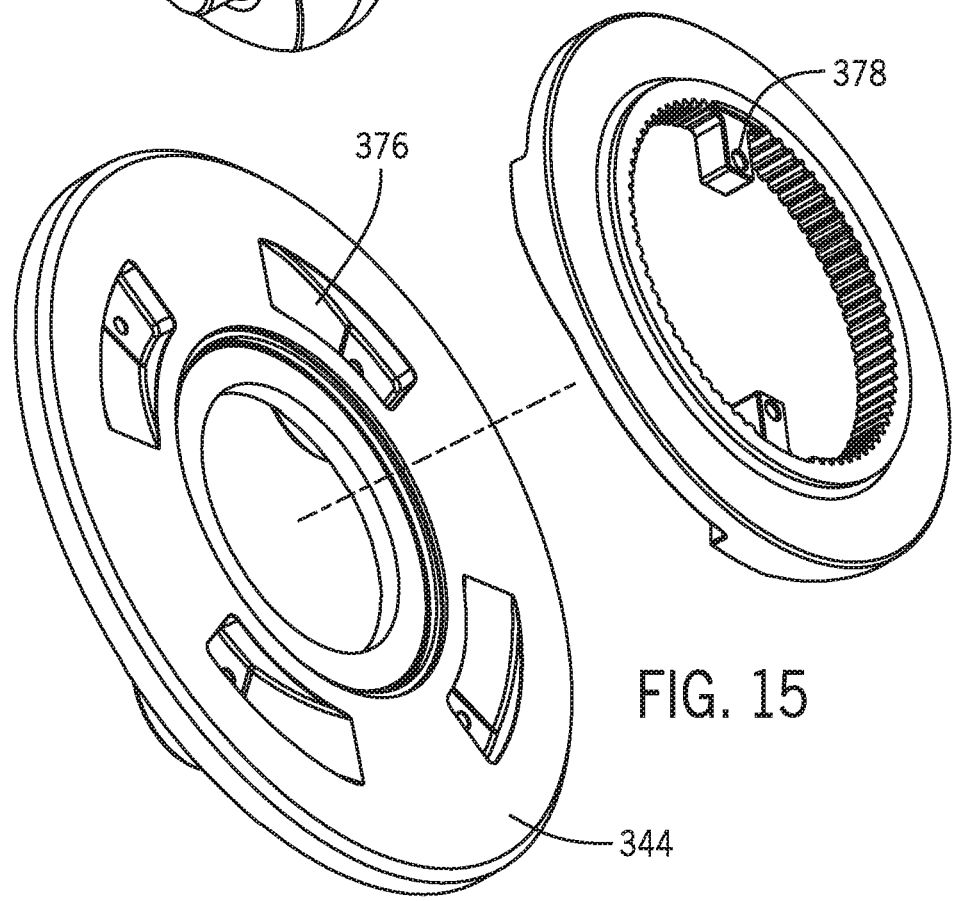

As best shown by FIGS. 6, 14, and 15, the first clutch 370 may be formed by a first clutch element 372 that is generally ring shaped with internal splines that engage corresponding splines on the stationary housing element 304 that function to rotationally fix the first clutch element 372 while enabling axial movement of the first clutch element 372 towards and away from the second-stage planet carrier 344. The views of FIGS. 14 and 15 are isolated views of the first clutch element 372 and second-stage planet carrier 344. As shown, the first clutch element 372 includes a circumferential row of engagement features 374 oriented towards the second-stage planet carrier 344, and the second-stage planet carrier 344 includes a corresponding circumferential row of engagement features 376 oriented towards the first clutch element 372. Mounting tabs 378 on the clutch element 372 enable one or more actuators to axially reposition the clutch element 372 into and/or out engagement with the second-stage planet carrier 344.

The engagement features 374, 376 enable interaction between various components of the planetary gear set 320 at the second-stage planet carrier 344 and the clutch 370. Generally, the engagement features 374, 376 are configured as cooperating sets of protrusions, dogs, slots, locks, or pockets that interact when engaged. In this example, the engagement features 374 on the first clutch element 372 are protrusions, each with a ramped side and a perpendicular side; and the engagement features 376 on the second-stage planet carrier 344 are cooperating slots, each with a ramped side and a perpendicular side that circumferentially oppose those of the cooperating engagement features 374. As a result of this arrangement and as discussed in greater detail below, the first clutch element 372 may be selectively moved into engagement with the second-stage planet carrier 344 via tabs 378 such that the engagement features 374, 376 mate with one another to ground the second-stage planet carrier 344 to the stationary housing element 304 (e.g., to prevent rotation) as the second-stage planet gears 342 and ring gear 330 rotate in the first rotational direction D1. In other examples, the engagement features 374, 376 may be bidirectional (e.g., with matching perpendicular walls on each side) to ground the second-stage planet carrier 344 to the stationary housing element 304 as the second-stage planet gears 342 and ring gear 330 rotate in the either rotational direction D1, D2.

Figure 10:
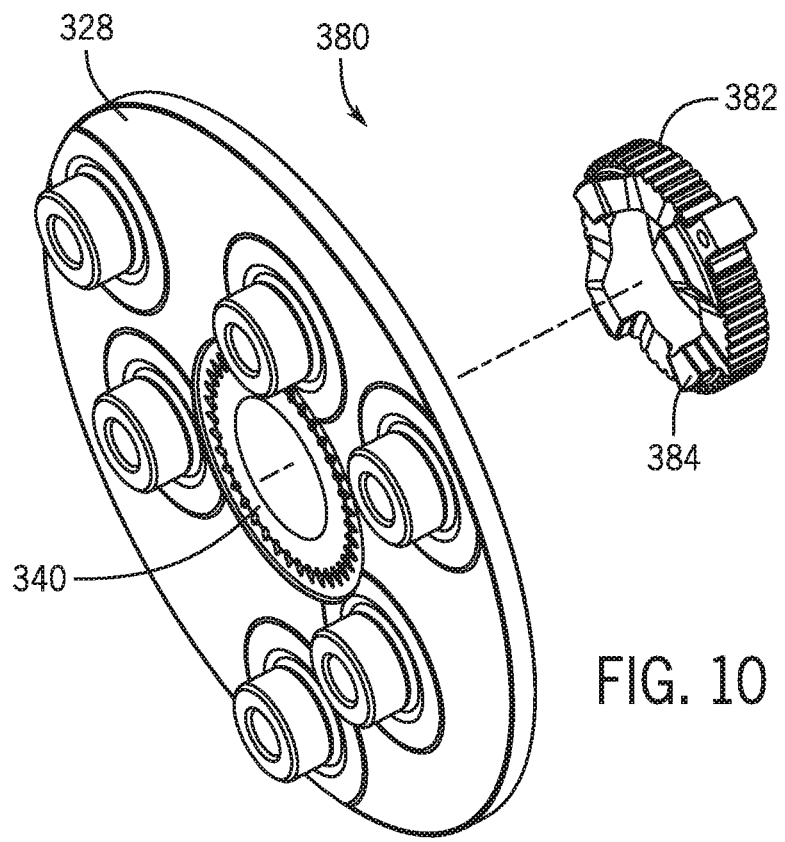
FIGS. 10 and 11 are partially exploded first and second side views of a first-stage planet carrier, a second-stage sun gear, and a clutch that may be incorporated into the power transmission assembly of FIG. 5 for the example starter-generator device.
Figure 11:
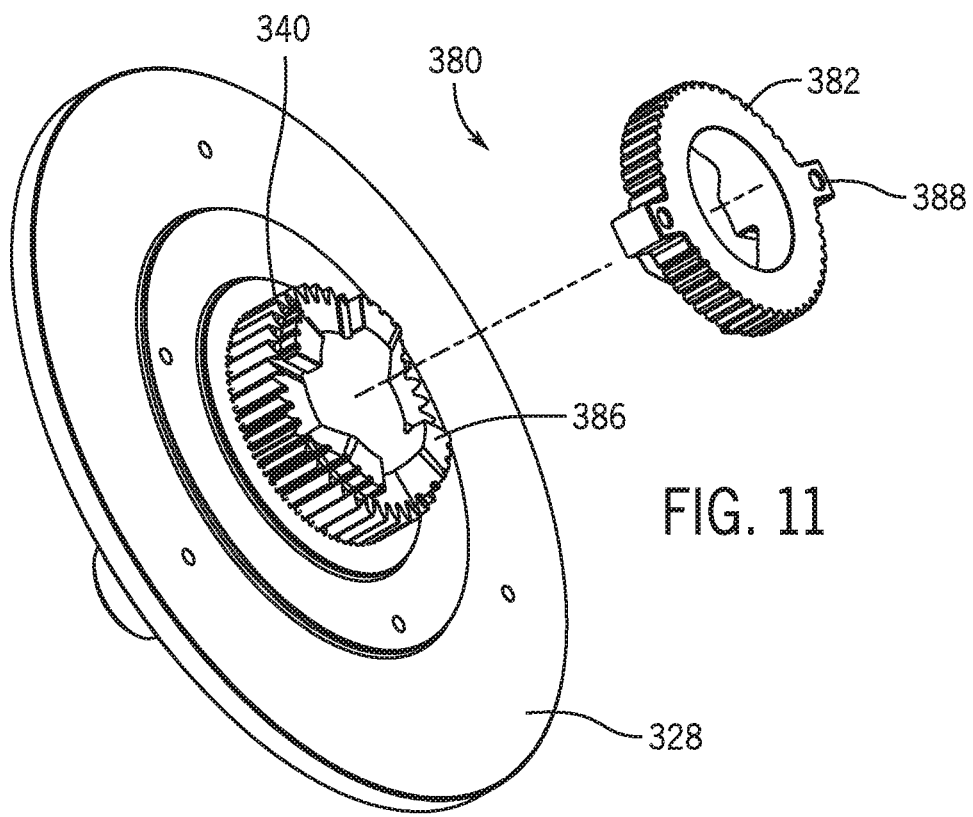
Figure 12:
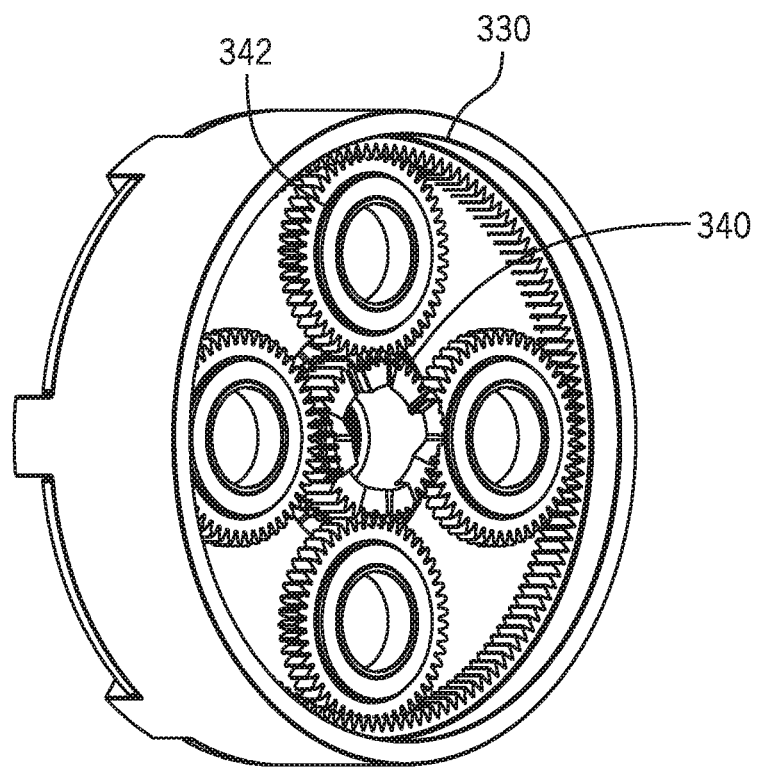
FIGS. 12 and 13 are respective isometric and end views of a ring gear, second-stage planet gears, and a second-stage sun gear that may be incorporated into the power transmission assembly of FIG. 5 for the example starter-generator device.
Figure 13:
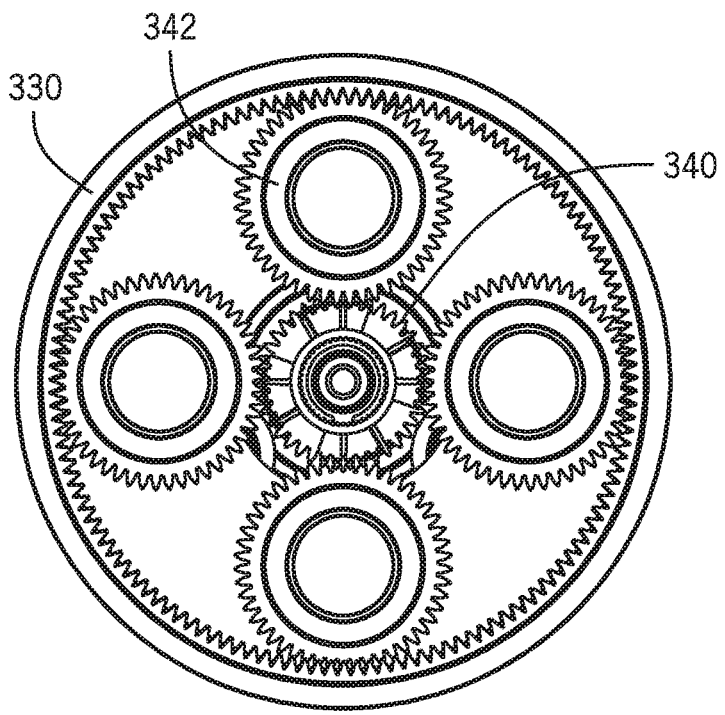

As best shown by FIGS. 6, 10, and 11, the second clutch 380 may be formed by a second clutch element 382 that is generally ring shaped with external or outwardly extending splines that engage corresponding splines on the stationary housing element 304 that function to rotationally fix the second clutch element 382 while enabling axial movement of the second clutch element 382 towards and away from the second-stage sun gear 340. The views of FIGS. 10 and 11 are isolated views of the second clutch element 382, the second-stage sun gear 340, and the first-stage planet carrier 328. As noted above, the first-stage planet carrier 328 receives a splined portion of the second-stage sun gear 340 to rotationally fix the first-stage planet carrier 328 and the second-stage sun gear 340 (e.g., such that the first-stage planet carrier 328 and the second-stage sun gear 340 rotate together or are stationary together).

As shown, the second clutch element 382 includes a circumferential row of engagement features 384 oriented towards the second-stage sun gear 340, and the second-stage sun gear 340 includes a corresponding circumferential row of engagement features 386 oriented towards the second clutch element 382. Mounting tabs 388 on the clutch element 382 enable one or more actuators to axially reposition the clutch element 382 into and/or out of engagement with the second-stage sun gear 340.

As above, the engagement features 384, 386 enable interaction between various components of the planetary gear set 320 at the second-stage sun gear 340 and the clutch 380. In this example, the engagement features 384 on the second clutch element 382 are protrusions, each with a ramped side and a perpendicular side; and the engagement features 386 on the second-stage sun gear 340 are cooperating slots, each with a ramped side and a perpendicular side that circumferentially oppose those of the cooperating engagement features 384. As a result of this arrangement and as discussed in greater detail below, the second clutch element 382 is selectively moved into engagement with the second-stage sun gear 340 via tabs 388 such that the engagement features 384, 386 mate with one another to ground the second-stage sun gear 340 and thus the first-stage planet carrier 328 to the stationary housing element 304 (e.g., to prevent rotation) as the first-stage planet gears 326 and ring gear 330 rotate in the first rotational direction D1 and the idler gears 324 rotate in the second rotational direction D2. In other examples, the engagement features 384, 386 may be bidirectional (e.g., with matching perpendicular walls on each side) to ground the second-stage sun gear 340 and the first-stage planet carrier 328 to the stationary housing element 304 as the idler gears 324, first-stage planet gears 326, and ring gear 330 rotate in the either rotational direction D1, D2.

Figure 16:
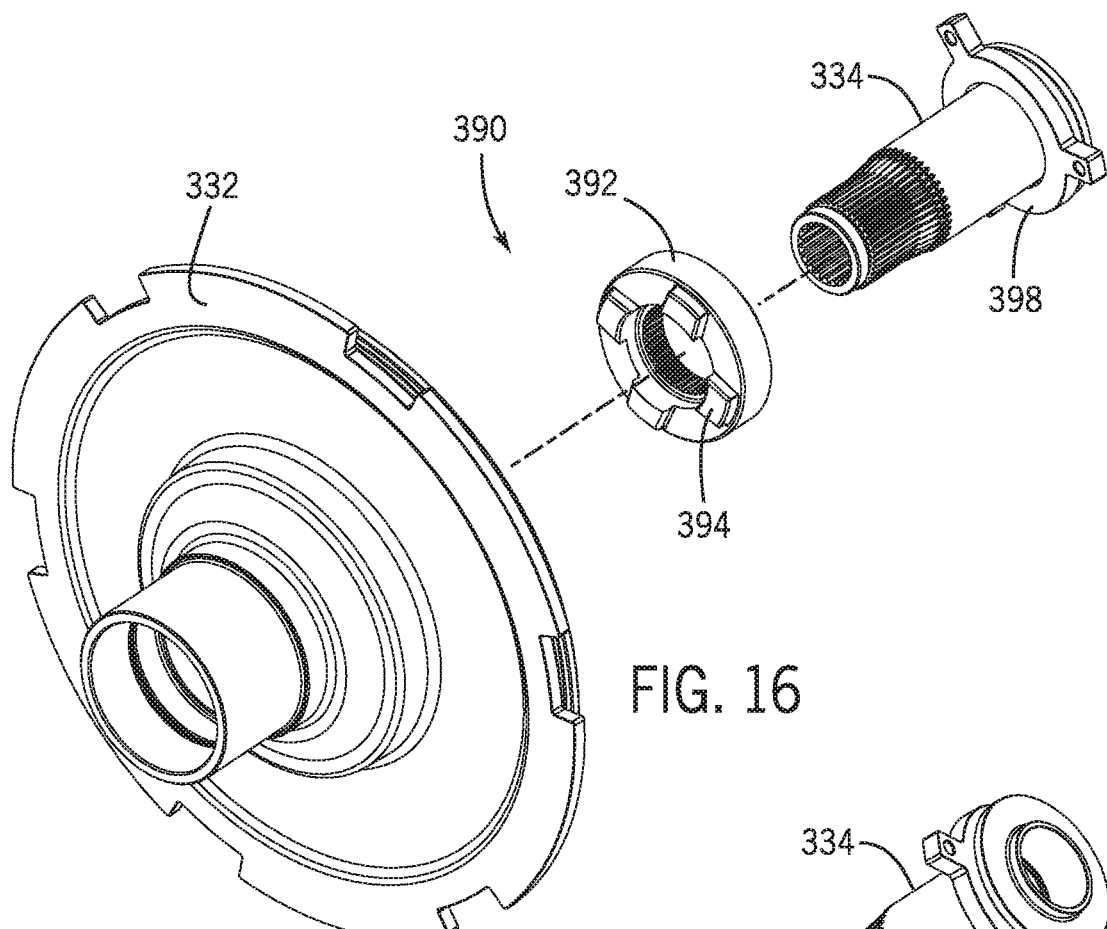
FIGS. 16 and 17 are partially exploded first and second side views of a sun gear shaft, ring gear cover, and a clutch that may be incorporated into the power transmission assembly of FIG. 5 for the example starter-generator device.
Figure 17:
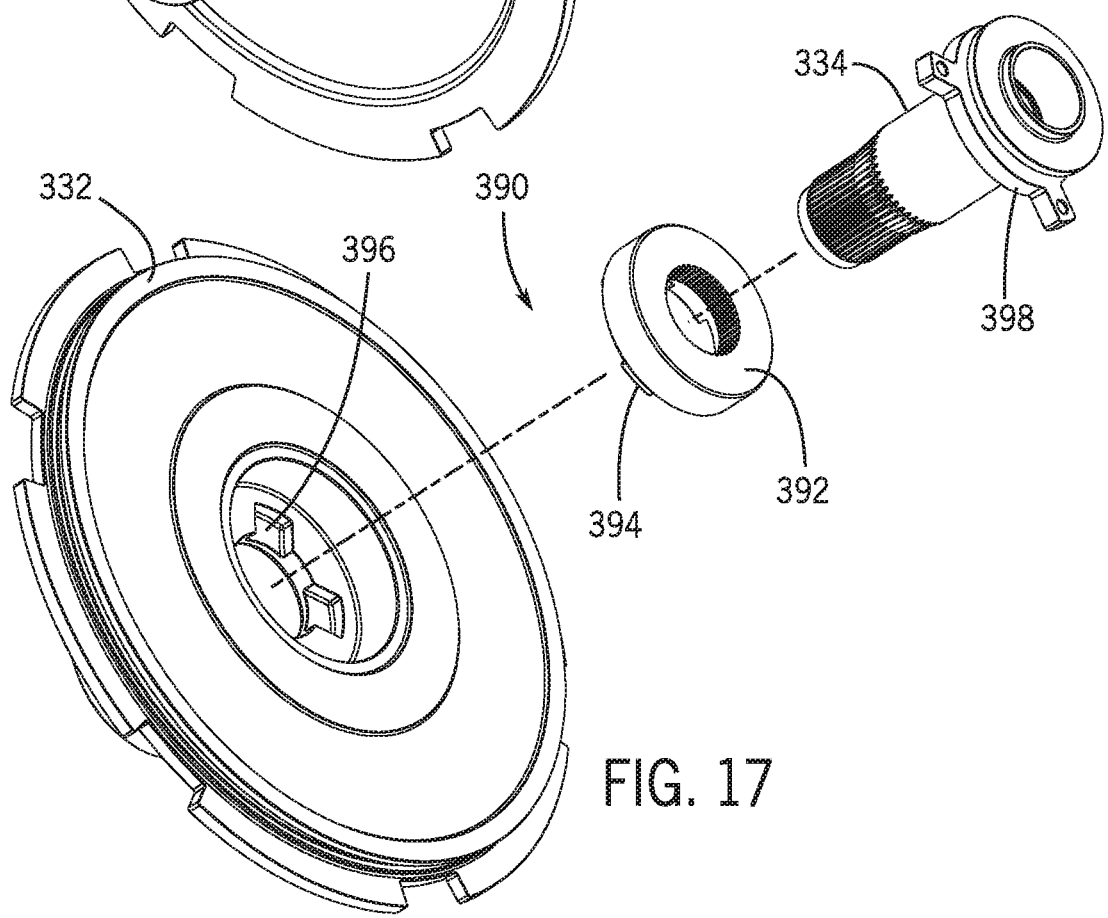

As best shown by FIGS. 6A, 6B, 16, and 17, the third clutch 390 may be formed by a third clutch element 392 that is generally ring shaped and is fixed to the sun gear shaft 334 at a position proximate to the ring gear cover 332 and a third clutch actuation ring 398 (e.g., with tabs to enable clutch actuation by an actuator) on the sun gear shaft 334 to enable the sun gear shaft 334 to be repositioned along the input shaft 310 such that the third clutch element 392 may move into and/or out of engagement with the ring gear cover 332, thereby rotationally fixing the input shaft 310 to the ring gear 330. The views of FIGS. 16 and 17 are isolated views of the sun gear shaft 334, the third clutch element 392, the ring gear cover 332, and the third clutch actuation ring 398. As shown, the third clutch element 392 includes one or more engagement features 394 that engage with corresponding engagement features 396 on the inner surface of the ring gear cover 332.

As such, the third clutch 390 may be used to axially reposition the third clutch element 392 between an engaged position in which the input shaft 310 322 is rotationally fixed to the ring gear 330 and a disengaged position in which the input shaft 310 is not directly fixed to rotate with the ring gear 330.

As introduced above, the power transmission assembly 132 may be operated to selectively function in one of four different modes, including: a first or low engine start mode in which the power transmission assembly 132 transfers power from the battery 140 to the engine 120 with a first gear ratio; a second or warm engine start mode in which the power transmission assembly 132 transfers power from the battery 140 to the engine 120 with a second gear ratio; a third or boost mode in which the power transmission assembly 132 transfers power from the battery 140 to the engine 120 with a third gear ratio; and a generation mode in which the power transmission assembly 132 transfers power from the engine 120 to the battery 140 in a fourth gear ratio, which in this example is equal to the third gear ratio. The first three modes may be considered "delivery" modes in which the transmission assembly 132 delivers power from the battery 140 to the engine 120. Comparatively, the first and second (e.g., the "engine start") modes are relatively low speed and relatively high torque output, and the boost and generation modes are relatively high speed and relatively low torque output. As such, the power transmission assembly 132 may have different gearing ratios to transfer power along different power flow paths, depending on the mode. As discussed in greater below, the rotation of the various elements of the power transmission assembly 132 may be summarized by the following Table (1):

TABLE (1)

|  | Delivery Mode | | | Generation Mode |
| --- | --- | --- | --- | --- |
|  | Cold | Warm | Boost |  |
| first-stage sun gear | D1 | D1 | D1 | D1 |
| first-stage idler gears | D2 | D2 | D2 | D2 |
| first-stage planet gears | D1 | D1 | D1 | D1 |
| first-stage planet carrier | D2 | grounded | D1 | D1 |
| second-stage sun gear | D2 | grounded | D1 | D1 |
| second-stage planet gears | D1 | D1 | D2 | D2 |
| second-stage planet carrier | grounded | D1 | D2 | D2 |
| ring gear | D1 | D1 | D1 | D1 |

In the cold engine start mode of the depicted example, the first clutch 370 is placed into the engaged position (e.g., by an actuator commanded on or off by the controller 150, as appropriate) while the second and third clutches 380, 390 are positioned in disengaged positions. In this arrangement, the first engagement features 374 of the first clutch element 372 mate with the engagement features 376 on the second-stage planet carrier 344. Since the first clutch element 372 is splined to the stationary housing element 304, engagement of the engagement features 374, 376 also functions to ground the second-stage planet carrier 344 to the stationary housing element 304.

As the second-stage planet carrier 344 is grounded, the power transmission assembly 132 may operate in the cold engine start mode. In the cold engine start mode, the engine 120 may be initially inactive, and activation of the ignition by an operator in the cabin 108 of the work vehicle 100 energizes the electric machine 134 to operate as a motor. In particular and additionally referring to FIG. 3, the electric machine 134 rotates the pulley 220 in the first rotational direction D1, thereby driving the belt 230 and pulley 210 in the first rotational direction D1. The pulley 210 drives the element 135, and thus the input shaft 310, in the first rotational direction D1. Rotation of the input shaft 310 drives rotation of the first-stage sun gear 322 in the first rotational direction D1, and in turn, rotation of the first-stage sun gear 322 in the first rotational direction D1 drives rotation of the first-stage idler gears 324 in the second rotational direction D2. Rotation of the first-stage idler gears 324 in the second rotational direction D2 drives rotation of the first-stage planet gears 326 in the first rotational direction D1, which in turn functions to drive the first-stage planet carrier 328 in the second rotational direction D2, as well as the second-stage sun gear 340 in the second rotational direction D2. Since the second-stage planet carrier 344 is rotationally grounded, rotation of the second-stage sun gear 340 in the second rotational direction D2 drives the second-stage planet gears 342 in the first rotational direction D1, which in turn drives the ring gear 330 in the first rotational direction D1. As such, the output of the power transmission assembly 132 (e.g., at the ring gear 330) in the cold engage start mode is oriented in the same direction as the input (e.g., at the input shaft 310).

In one example, the power transmission assembly 132 provides a 15:1 gear ratio in the power flow direction of the cold engine start mode. In other embodiments, other gear ratios (e.g., 10:1-30:1) may be provided. Considering a 4:1 gear ratio from the power transfer belt arrangement 200, a resulting 60:1 gear ratio (e.g., approximately 40:1 to about 120:1) may be achieved for the starter-generator device 130 between the electric machine 134 and the engine 120 during the cold engine start mode. As such, if for example the electric machine 134 is rotating at 10,000 RPM, the crankshaft 122 of the engine 120 rotates at about 100-150 RPM. In one example, the power transmission assembly 132 may deliver a torque of approximately 3000 Nm to the engine 120. Accordingly, the electric machine 134 may thus have normal operating speeds with relatively lower speed and higher torque output for cold engine start up.

In the warm engine start mode of the depicted example, the second clutch 380 is placed into the engaged position (e.g., by an actuator commanded on or off by the controller 150, as appropriate) while the first and third clutches 370, 390 are positioned in disengaged positions. In this arrangement, the engagement features 384 of the second clutch element 382 mate with the engagement features 386 on the second-stage sun gear 340. Since the second clutch element 382 is splined to the stationary housing element 304 and the second-stage sun gear 340 is splined to the first-stage planet carrier 328, engagement of the engagement features 384, 386 also functions to ground the second-stage sun gear 340 and the first-stage planet carrier 328 to the stationary housing element 304.

As the first-stage planet carrier 328 is grounded, the power transmission assembly 132 may operate in the warm engine start mode. In the warm engine start mode, the engine 120 may be initially inactive or active. In any event, the controller 150 energizes the electric machine 134 to operate as a motor. In particular and additionally referring to FIG. 3, the electric machine 134 rotates the pulley 220 in the first rotational direction D1, thereby driving the belt 230 and pulley 210 in the first rotational direction D1. The pulley 210 drives the element 135, and thus the input shaft 310, in the first rotational direction D1.

Since the first-stage sun gear 322 is mounted on the input shaft 310, rotation of the input shaft 310 in the first rotational direction D1 also rotates the first-stage sun gear 322 in the first rotational direction D1. In turn, rotation of the first-stage sun gear 322 in the first rotational direction D1 drives rotation of the first-stage idler gears 324 in the second rotational direction D2, which functions to drive rotation of first-stage planet gears 326 in the first rotational direction D1. Since the first-stage planet carrier 328 and second-stage sun gear 340 are grounded, rotation of the first-stage planet gears 326 in the first rotational direction D1 drives rotation of the ring gear 330 in the first rotational direction D1. As such, the output of the power transmission assembly 132 (e.g., at the ring gear 330) in the warm engage start mode is oriented in the same direction as the input (e.g., at the input shaft 310).

As noted above, the ring gear 330 functions as the power transfer element 133 to interface with the crankshaft 122 of the engine 120 to drive and facilitate engine start. In effect, during the warm engine start mode, the power transmission assembly 132 operates as a sun-in, ring-out configuration, albeit at a lower gear ratio as compared to the cold engine start mode resulting from using the ratios of the first-stage idler gears 324 and the first-stage planet gear 326 as opposed to the compounded ratio in cooperation with the second-stage planet gears 342.

In one example, the power transmission assembly 132 provides a 4:1 gear ratio in the power flow direction of the warm engine start mode. In other embodiments, other gear ratios (e.g., 3:1-7:1) may be provided. Considering a 4:1 gear ratio from the power transfer belt arrangement 200, a resulting 16:1 gear ratio (e.g., approximately 12:1 to about 28:1) may be achieved for the starter-generator device 130 between the electric machine 134 and the engine 120 during the warm engine start mode. As such, if for example the electric machine 134 is rotating at 10,000 RPM, the crankshaft 122 of the engine 120 rotates at about 600-700 RPM. In one example, the torque output of the power transmission assembly 132 for the engine 120 is approximately 400-600 Nm. Accordingly, the electric machine 134 may thus have normal operating speeds with a relatively lower speed and higher torque output for engine start up or boost.

In the boost engine start mode of the depicted example, the third clutch 390 is placed into the engaged position (e.g., by an actuator commanded on or off by the controller 150, as appropriate) while the first and second clutches 370, 380 are positioned in disengaged positions. In this arrangement, the sun gear shaft 334 is shifted such that the third clutch element 392 to engage the ring gear cover 332, thereby fixing the input shaft 310 and ring gear 330 for collective rotation.

As the input shaft 310 and the ring gear 330 are locked for collective rotation, the power transmission assembly 132 may operate in the boost mode. In the boost mode, the engine 120 may be initially active and the controller 150 energizes the electric machine 134 to operate as a motor. In particular and additionally referring to FIG. 3, the electric machine 134 rotates the pulley 220 in the first rotational direction D1, thereby driving the belt 230 and pulley 210 in the first rotational direction D1. The pulley 210 drives the element 135, and thus the input shaft 310, in the first rotational direction D1. Rotation of the input shaft 310 drives rotation of the ring gear 330 about the primary rotational axis in the same first rotational direction D1. As noted above, the ring gear 330 functions as the power transfer element 133 to interface with the crankshaft 122 of the engine 120 to drive the engine 120. In effect, during the boost mode, the power transmission assembly 132 operates as a sun-in, ring-out configuration.

In one example, the power transmission assembly 132 provides a 1:1 gear ratio in the power flow direction of the boost mode. In other embodiments, other gear ratios may be provided. Considering a 4:1 gear ratio from the power transfer belt arrangement 200, a resulting 4:1 gear ratio may be achieved for the starter-generator device 130 between the electric machine 134 and the engine 120 during the boost mode. As such, if for example the electric machine 134 is rotating at 10,000 RPM, the crankshaft 122 of the engine 120 rotates at about 2500 RPM. Accordingly, the electric machine 134 may thus have normal operating speeds while providing an appropriate boost speed to the engine 120.

The generation mode operates identically to the boost mode, except that the power is transferred through the transmission assembly 132 from the engine 120 to the electric machine 134. In the generator start mode of the depicted example, the third clutch 390 is placed into the engaged position (e.g., by an actuator commanded by the controller 150) while the first and second clutches 370, 380 are maintained or otherwise positioned in disengaged positions. As the second-stage sun gear 340 and the first-stage sun gear 322 are locked for collective rotation, the power transmission assembly 132 may operate in the generation mode. Subsequent to the engine start modes and/or the boost mode, the engine 120 begins to accelerate above rotational speed provided by power transmission assembly 132, and the electric machine 134 is commanded to decelerate and to cease providing torque to power transmission assembly 132. After the engine 120 has stabilized to a sufficient speed and the electric machine 134 has sufficiently decelerated or stopped, the third clutch 390 is engaged as described above to operate the power transmission assembly 132 in the generation mode.

In the generation mode, the engine 120 rotates the crankshaft 122 and power transfer element 133 that is engaged with the ring gear 330, thus driving the ring gear 330 in the first rotational direction D1. The ring gear 330 drives the input shaft 310 via the first-stage idler gear 324, first-stage planet gears 326, the second-stage planet gears 342, the first-stage sun gear 322, and the second-stage sun gear 340. Therefore, as the ring gear 330 rotates in the first rotational direction D1, the input shaft 310 is driven and similarly rotates in the first rotational direction D1 at the same rate of rotation. As noted above, the input shaft 310 is connected with and provides output power to the electric machine 134 in the first rotational direction D1 via the power transfer belt arrangement 200. In effect, during the generation mode, the power transmission assembly 132 operates as a ring-in, sun-out configuration In one example, the power transmission assembly 132 provides a 1:1 gear ratio in the power flow direction of the generation mode. In other embodiments, other gear ratios may be provided. Considering a 4:1 gear ratio from the power transfer belt arrangement 200, a resulting 4:1 gear ratio may be achieved for the starter-generator device 130 between the electric machine 134 and the engine 120 during the generation mode. As a result, the electric machine 134 may thus have normal operating speeds in both power flow directions with relatively low torque output during power generation.

Thus, various embodiments of the vehicle electric system have been described that include an integrated starter-generator device. Various transmission assemblies may be included in the device, thus reducing the space occupied by the system. The transmission assembly may provide multiple speeds or gear ratios and transition between speeds/gear ratios. One or more clutch arrangements may be used to selectively apply torque to the gear set of the transmission assembly in both power flow directions. Moreover, such gear sets and clutch arrangements enable the engine and the electric machine to provide and receive power at multiple speeds in a common rotational direction.

Also, the following examples are provided, which are numbered for easier reference.

1. A combination starter-generator device for a work vehicle having an engine with an engine crankshaft configured to rotate in a first rotational direction, the combination starter-generator device comprising: an electric machine with an electric machine shaft configured to rotate in the first rotational direction; and a power transmission assembly including a drive shaft and configured to transfer power between the electric machine and the engine, the power transmission assembly including: a planetary gear set with a first planetary gear set stage coupled to the electric machine shaft and a second planetary gear set stage coupled to the first planetary gear set stage, wherein one or more of the first planetary gear set stage and the second planetary gear set stage include an idler gear, and one or more of the first planetary gear set stage and the second planetary gear set stage include a ring gear coupled to the engine crankshaft; and a clutch arrangement with at least one clutch selectively coupled to one or more of the first planetary gear set stage and the second planetary gear set stage to effect at least one delivery mode in which power flows in a first power flow direction and at least one generation mode in which power flows in a second power flow direction, wherein, in the at least one delivery mode, one or more of the first planetary gear set stage and the second planetary gear set stage receives input power in the first rotational direction from the electric machine via the electric machine shaft and outputs power in the first rotational direction to the engine crankshaft as the first power flow direction, and wherein, in the at least one generation mode, one or more of the first planetary gear set stage and the second planetary gear set stage receives input power in the first rotational direction from the engine crankshaft and outputs power in the first rotational direction to the electric machine via the electric machine shaft as the second power flow direction.

2. The combination starter-generator device of example 1, wherein the first planetary gear set stage includes a first-stage sun gear coupled to the drive shaft and first-stage planet gears engaged with the ring gear, and wherein a plurality of the idler gears are engaged between the first-stage sun gear and the first-stage planet gears.

3. The combination starter-generator device of example 2, wherein both the first planetary gear set stage and the second planetary gear set stage engage the ring gear.

4. The combination starter-generator device of example 3, wherein the first planetary gear set stage has a first-stage planet carrier supporting the plurality of the idler gears and the first-stage planet gears, and the second planetary gear set stage includes a second-stage sun gear rotationally coupled to the first-stage planet carrier.

5. The combination starter-generator device of example 4, wherein the clutch arrangement is configured to effect multiple delivery modes in the first power flow direction.

6. The combination starter-generator device of example 5, wherein the second planetary gear set stage includes second-stage planet gears engaged with the second-stage sun gear and the ring gear and a second-stage planet carrier supporting the second-stage planet gears, wherein the power transmission assembly includes a housing that at least partially encloses the planetary gear set, the housing including at least one stationary housing element, and wherein the clutch arrangement includes a first clutch configured to, in a first delivery mode of the at least one delivery mode, engage to rotationally fix the second-stage planet carrier to the at least one stationary housing element.

7. The combination starter-generator device of example 6, wherein the power transmission assembly is configured, in the first delivery mode of the at least one delivery mode, to transfer rotational power from the electric machine in the first power flow direction from the drive shaft, to the first-stage sun gear, to the first-stage planet gear, to the first-stage planet carrier, to the second-stage sun gear, to the second-stage planet gears, and to the ring gear, out to the engine at a first gear ratio.

8. The combination starter-generator device of example 6, wherein the clutch arrangement includes a second clutch configured, to, in a second delivery mode of the at least one delivery mode, engage to rotationally fix the second-stage sun gear to the at least one stationary housing element.

9. The combination starter-generator device of example 8, wherein the power transmission assembly is configured, in the second delivery mode of the at least one delivery mode, to transfer rotational power from the electric machine in the first power flow direction from the drive shaft, to the first-stage sun gear, to the first-stage planet gears, and to the ring gear, out to the engine at a second gear ratio.

10. The combination starter-generator device of example 8, wherein the clutch arrangement includes a third clutch configured to, in a third delivery mode of the at least one delivery mode, engage to couple drive shaft to the ring gear.

11. The combination starter-generator device of example 10, wherein the power transmission assembly is configured, in the third delivery mode of the at least one delivery mode, to transfer rotational power from the electric machine in the first power flow direction from the drive shaft, to the ring gear, and out to the engine at a third gear ratio.

12. The combination starter-generator device of example 10, wherein the power transmission assembly is configured, in a first generation mode of the at least one generation mode, to transfer rotational power from the engine, to the ring gear, to the drive shaft, and out to the electric machine at a third gear ratio.

13. A power transmission assembly of a combination starter-generator device for a work vehicle and configured to transfer rotational power between an engine with a crankshaft and an electric machine with an electric machine shaft, the power transmission assembly comprising: a drive shaft coupled to the electric machine shaft and configured to rotate in a first rotational direction; a planetary gear set including a first planetary gear set stage coupled to the drive shaft and a second planetary gear set stage coupled to the first planetary gear set stage, wherein one or more of the first planetary gear set stage and the second planetary gear set stage include an idler gear, and one or more of the first planetary gear set stage and the second planetary gear set stage include a ring gear coupled to the engine crankshaft; and a clutch arrangement with at least one clutch selectively coupled to one or more of the first planetary gear set stage and the second planetary gear set stage to effect at least one delivery mode in which power flows in a first power flow direction and at least one generation mode in which power flows in a second power flow direction, wherein, in the at least one delivery mode, one or more of the first planetary gear set stage and the second planetary gear set stage receives input power in the first rotational direction from the electric machine via the drive shaft and outputs power in the first rotational direction to the engine crankshaft as the first power flow direction, and wherein, in the at least one generation mode, one or more of the first planetary gear set stage and the second planetary gear set stage receives input power in the first rotational direction from the engine crankshaft and outputs power in the first rotational direction to the electric machine via the drive shaft as the second power flow direction.

14. The power transmission assembly of example 13, wherein the first planetary gear set stage includes a first-stage sun gear coupled to the drive shaft and first-stage planet gears engaged with the ring gear, and wherein a plurality of the idler gears are engaged between the first-stage sun gear and the first-stage planet gears.

15. The power transmission assembly of example 14, wherein both the first planetary gear set stage and the second planetary gear set stage engage the ring gear As will be appreciated by one skilled in the art, certain aspects of the disclosed subject matter can be embodied as a method, system (e.g., a work vehicle control system included in a work vehicle), or computer program product. Accordingly, certain embodiments can be implemented entirely as hardware, entirely as software (including firmware, resident software, micro-code, etc.) or as a combination of software and hardware (and other) aspects. Furthermore, certain embodiments can take the form of a computer program product on a computer-usable storage medium having computer-usable program code embodied in the medium.

Any suitable computer usable or computer readable medium can be utilized. The computer usable medium can be a computer readable signal medium or a computer readable storage medium. A computer-usable, or computer-readable, storage medium (including a storage device associated with a computing device or client electronic device) can be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium can be any tangible medium that can contain, or store a program for use by or in connection with the instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be non-transitory and can be any computer readable medium that is not a computer readable storage medium and that can communicate, propagate, or transport a program for use by or in connection with an instruction execution system, apparatus, or device.

Aspects of certain embodiments are described herein can be described with reference to flowchart illustrations and/or block diagrams of methods, apparatus (systems) and computer program products according to embodiments of the disclosure. It will be understood that each block of any such flowchart illustrations and/or block diagrams, and combinations of blocks in such flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, can illustrate the architecture, functionality, and operation of possible implementations of systems, methods and computer program products according to various embodiments of the present disclosure. In this regard, each block in the flowchart or block diagrams can represent a module, segment, or portion of code, which includes one or more executable instructions for implementing the specified logical function(s). It should also be noted that, in some alternative implementations, the functions noted in the block (or otherwise described herein) can occur out of the order noted in the figures. For example, two blocks shown in succession (or two operations described in succession) can, in fact, be executed substantially concurrently, or the blocks (or operations) can sometimes be executed in the reverse order, depending upon the functionality involved. It will also be noted that each block of any block diagram and/or flowchart illustration, and combinations of blocks in any block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A combination starter-generator device for a work vehicle having an engine with an engine crankshaft configured to rotate in a first rotational direction, the combination starter-generator device comprising: an electric machine with an electric machine shaft configured to rotate in the first rotational direction; and a power transmission assembly including a drive shaft and configured to transfer power between the electric machine and the engine, the power transmission assembly including: a planetary gear set with a first planetary gear set stage coupled to the electric machine shaft and a second planetary gear set stage coupled to the first planetary gear set stage, wherein the first planetary gear set stage includes an idler gear, and one or more of the first planetary gear set stage and the second planetary gear set stage include a ring gear coupled to the engine crankshaft; and a clutch arrangement with at least one clutch selectively coupled to one or more of the first planetary gear set stage and the second planetary gear set stage to effect at least one delivery mode in which power flows in a first power flow direction and at least one generation mode in which power flows in a second power flow direction, wherein, in the at least one delivery mode, one or more of the first planetary gear set stage and the second planetary gear set stage receives input power in the first rotational direction from the electric machine via the electric machine shaft and outputs power in the first rotational direction to the engine crankshaft as the first power flow direction, and wherein, in the at least one generation mode, one or more of the first planetary gear set stage and the second planetary gear set stage receives input power in the first rotational direction from the engine crankshaft and outputs power in the first rotational direction to the electric machine via the electric machine shaft as the second power flow direction; wherein the first planetary gear set stage includes a first-stage sun gear coupled to the drive shaft and first-stage planet gears engaged with the ring gear, and wherein a plurality of the idler gears are engaged between the first-stage sun gear and the first-stage planet gears; and wherein the first planetary gear set stage has a first-stage planet carrier supporting the plurality of the idler gears and the first-stage planet gears, and the second planetary gear set stage includes a second-stage sun gear rotationally fixed to the first-stage planet carrier.

2. The combination starter-generator device of claim 1, wherein both the first planetary gear set stage and the second planetary gear set stage engage the ring gear.

3. The combination starter-generator device of claim 1, wherein the second planetary gear set stage includes second-stage planet gears engaged with the second-stage sun gear and the ring gear and a second-stage planet carrier supporting the second-stage planet gears, wherein the power transmission assembly includes a housing that at least partially encloses the planetary gear set, the housing including at least one stationary housing element, and wherein the clutch arrangement includes a first clutch configured to, in a first delivery mode of the at least one delivery mode, engage to rotationally fix the second-stage planet carrier to the at least one stationary housing element.

4. The combination starter-generator device of claim 3, wherein the power transmission assembly is configured, in the first delivery mode of the at least one delivery mode, to transfer rotational power from the electric machine in the first power flow direction from the drive shaft, to the first-stage sun gear, to the first-stage planet gears, to the first-stage planet carrier, to the second-stage sun gear, to the second-stage planet gears, and to the ring gear, out to the engine at a first gear ratio.

5. The combination starter-generator device of claim 3, wherein the clutch arrangement includes a second clutch configured, to, in a second delivery mode of the at least one delivery mode, engage to rotationally fix the second-stage sun gear to the at least one stationary housing element.

6. The combination starter-generator device of claim 5, wherein the power transmission assembly is configured, in the second delivery mode of the at least one delivery mode, to transfer rotational power from the electric machine in the first power flow direction from the drive shaft, to the first-stage sun gear, to the first-stage planet gears, and to the ring gear, out to the engine at a second gear ratio.

7. The combination starter-generator device of claim 5, wherein the clutch arrangement includes a third clutch configured to, in a third delivery mode of the at least one delivery mode, engage to couple the drive shaft to the ring gear.

8. The combination starter-generator device of claim 7, wherein the power transmission assembly is configured, in the third delivery mode of the at least one delivery mode, to transfer rotational power from the electric machine in the first power flow direction from the drive shaft to the ring gear, and out to the engine at a third gear ratio.

9. The combination starter-generator device of claim 7, wherein the power transmission assembly is configured, in a first generation mode of the at least one generation mode, to transfer rotational power from the engine, to the ring gear, to the drive shaft, and out to the electric machine at a third gear ratio.

10. The combination starter-generator device of claim 1, wherein the clutch arrangement is configured to effect multiple delivery modes in the first power flow direction.

11. A power transmission assembly of a combination starter-generator device for a work vehicle and configured to transfer rotational power between an engine with a crankshaft and an electric machine with an electric machine shaft, the power transmission assembly comprising: a drive shaft coupled to the electric machine shaft and configured to rotate in a first rotational direction; a planetary gear set including a first planetary gear set stage coupled to the drive shaft and a second planetary gear set stage coupled to the first planetary gear set stage, wherein the first planetary gear set stage includes an idler gear, and one or more of the first planetary gear set stage and the second planetary gear set stage include a ring gear coupled to the engine crankshaft; and a clutch arrangement with at least one clutch selectively coupled to one or more of the first planetary gear set stage and the second planetary gear set stage to effect at least one delivery mode in which power flows in a first power flow direction and at least one generation mode in which power flows in a second power flow direction, wherein, in the at least one delivery mode, one or more of the first planetary gear set stage and the second planetary gear set stage receives input power in the first rotational direction from the electric machine via the drive shaft and outputs power in the first rotational direction to the engine crankshaft as the first power flow direction, and wherein, in the at least one generation mode, one or more of the first planetary gear set stage and the second planetary gear set stage receives input power in the first rotational direction from the engine crankshaft and outputs power in the first rotational direction to the electric machine via the drive shaft as the second power flow direction; wherein the first planetary gear set stage includes a first-stage sun gear coupled to the drive shaft and first-stage planet gears engaged with the ring gear, and wherein a plurality of the idler gears are engaged between the first-stage sun gear and the first-stage planet gears; and wherein the first planetary gear set stage has a first-stage planet carrier supporting the plurality of the idler gears and the first-stage planet gears, and the second planetary gear set stage includes a second-stage sun gear rotationally fixed to the first-stage planet carrier.

12. The power transmission assembly of claim 11, wherein both the first planetary gear set stage and the second planetary gear set stage engage the ring gear.

13. The power transmission assembly of claim 11, wherein the second planetary gear set stage includes second-stage planet gears engaged with the second-stage sun gear and the ring gear and a second-stage planet carrier supporting the second-stage planet gears, wherein the power transmission assembly further includes a housing that at least partially encloses the planetary gear set, the housing including at least one stationary housing element, wherein the clutch arrangement includes a first clutch configured to, in a first delivery mode of the at least one delivery mode, engage to rotationally fix the second-stage planet carrier to the at least one stationary housing element, and wherein the planetary gear set is configured, in the first delivery mode of the at least one delivery mode, to transfer rotational power from the electric machine in the first power flow direction from the drive shaft, to the first-stage sun gear, to the first-stage planet gears, to the first-stage planet carrier, to the second-stage sun gear, to the second-stage planet gears, and to the ring gear, out to the engine at a first gear ratio.

14. The power transmission assembly of claim 13, wherein the clutch arrangement includes a second clutch configured, to, in a second delivery mode of the at least one delivery mode, engage to rotationally fix the second-stage sun gear to the at least one stationary housing element, and wherein the planetary gear set is configured, in the second delivery mode of the at least one delivery mode, to transfer the rotational power from the electric machine in the first power flow direction from the drive shaft, to the first-stage sun gear, to the first-stage planet gears, and to the ring gear, out to the engine at a second gear ratio.

15. The power transmission assembly of claim 14, wherein the clutch arrangement includes a third clutch configured to, in a third delivery mode of the at least one delivery mode, engage to couple the drive shaft to the ring gear, wherein the planetary gear set is configured, in the third delivery mode of the at least one delivery mode, to transfer the rotational power from the electric machine in the first power flow direction from the drive shaft to the ring gear, and out to the engine at a third gear ratio, and wherein the planetary gear set is configured, in a first generation mode of the at least one generation mode, to transfer the rotational power from the engine, to the ring gear, to the drive shaft, and out to the electric machine at the third gear ratio.

16. The power transmission assembly of claim 11, wherein the clutch arrangement is configured to effect multiple delivery modes in the first power flow direction.

* * * * *